United States Patent
Calegari et al.

(10) Patent No.: US 11,308,964 B2
(45) Date of Patent: *Apr. 19, 2022

(54) SYSTEMS AND METHODS FOR COOPERATIVELY-OVERLAPPED AND ARTIFICIAL INTELLIGENCE MANAGED INTERFACES

(71) Applicant: The Travelers Indemnity Company, Hartford, CT (US)

(72) Inventors: Douglas Calegari, Ivoryton, CT (US); Stephen Ziegelmayer, Hamden, CT (US)

(73) Assignee: The Travelers Indemnity Company, Hartford, CT (US)

( * ) Notice: Subject to any disclaimer, the term of this patent is extended or adjusted under 35 U.S.C. 154(b) by 100 days.

This patent is subject to a terminal disclaimer.

(21) Appl. No.: 16/995,971

(22) Filed: Aug. 18, 2020

(65) Prior Publication Data

US 2020/0380990 A1 Dec. 3, 2020

Related U.S. Application Data

(63) Continuation of application No. 16/019,625, filed on Jun. 27, 2018, now Pat. No. 10,777,196.

(51) Int. Cl.
| | |
|---|---|
| *G10L 15/22* | (2006.01) |
| *G06F 9/451* | (2018.01) |
| *H04L 51/02* | (2022.01) |
| *G06N 3/08* | (2006.01) |
| *G06Q 40/08* | (2012.01) |
| *G06F 16/332* | (2019.01) |

(52) U.S. Cl.
CPC ............. *G10L 15/22* (2013.01); *G06F 9/453* (2018.02); *G06F 16/3329* (2019.01); *G06N 3/08* (2013.01); *G06Q 40/08* (2013.01); *H04L 51/02* (2013.01)

(58) Field of Classification Search
CPC ........................................... G10L 15/22
See application file for complete search history.

(56) References Cited

U.S. PATENT DOCUMENTS

| | | | |
|---|---|---|---|
| 2003/0061200 A1 | 3/2003 | Hubert | |
| 2003/0069877 A1 | 4/2003 | Grefenstette | |
| 2005/0071161 A1* | 3/2005 | Shen | G10L 15/22 704/236 |
| 2005/0216271 A1* | 9/2005 | Konig | G10L 15/22 704/275 |

(Continued)

OTHER PUBLICATIONS

Office Action for U.S. Appl. No. 16/019,625 dated Feb. 7, 2020; 11 pps.

(Continued)

*Primary Examiner* — Douglas Godbold
(74) *Attorney, Agent, or Firm* — RowanTree Law Group, PLLC; Carson C. K. Fincham

(57) ABSTRACT

Systems, apparatus, methods, and articles of manufacture for cooperatively-overlapped and Artificial Intelligence (AI)-managed interfaces. For example, multiple cooperatively and/or partially overlapped interfaces may be provided (e.g., via an electronic and/or touch-screen device), with such interfaces being dynamically managed by various AI components, such as natural language processing, machine learning techniques, and/or neural network data processing.

10 Claims, 9 Drawing Sheets

(56) References Cited

U.S. PATENT DOCUMENTS

| | | |
|---|---|---|
| 2011/0314010 A1 | 12/2011 | Ganti |
| 2012/0296638 A1* | 11/2012 | Patwa .................... G10L 15/22 |
| | | 704/9 |
| 2016/0042735 A1* | 2/2016 | Vibbert ................ G10L 15/222 |
| | | 704/257 |
| 2016/0171050 A1 | 6/2016 | Das |
| 2016/0260431 A1* | 9/2016 | Newendorp ............ G10L 15/32 |
| 2017/0323200 A1 | 11/2017 | Corvinelli |
| 2018/0032576 A1 | 2/2018 | Romero |
| 2018/0033436 A1* | 2/2018 | Zhou ...................... G10L 15/00 |
| 2018/0165588 A1 | 6/2018 | Saxena |
| 2018/0233140 A1* | 8/2018 | Koishida .......... H04N 21/44222 |
| 2018/0277108 A1 | 9/2018 | Badr |
| 2018/0336198 A1* | 11/2018 | Zhong ............... G06F 16/24522 |
| 2018/0341716 A1 | 11/2018 | Iyer |
| 2019/0073998 A1* | 3/2019 | Leblang .............. G06F 16/3344 |
| 2019/0138648 A1* | 5/2019 | Gupta ................. G06F 16/3329 |
| 2019/0179607 A1* | 6/2019 | Thangarathnam ...... G06F 3/167 |
| 2019/0204907 A1 | 7/2019 | Xie |
| 2019/0205726 A1 | 7/2019 | Khabiri |
| 2019/0272825 A1* | 9/2019 | O'Malley ............... G10L 15/22 |

OTHER PUBLICATIONS

Notice of Allowance for U.S. Appl. No. 16/019,625 dated May 18, 2020; 12 pps.

* cited by examiner

US 11,308,964 B2

SYSTEMS AND METHODS FOR COOPERATIVELY-OVERLAPPED AND ARTIFICIAL INTELLIGENCE MANAGED INTERFACES

CROSS-REFERENCE TO RELATED APPLICATIONS

This application claims benefit and priority under 35 U.S.C. § 120 to, and is a Continuation of, U.S. patent application Ser. No. 16/019,625 filed on Jun. 27, 2018 and titled "SYSTEMS AND METHODS FOR COOPERATIVELY-OVERLAPPED AND ARTIFICIAL INTELLIGENCE MANAGED INTERFACES", which issued as U.S. Pat. No. 10,777,196 on Sep. 15, 2020, which is hereby incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND

Usage of interfaces on electronic devices (particularly on mobile and/or touch-screen devices) has become ubiquitous. Graphical User Interface (GUI) objects have become so widely utilized that improvements to how such interfaces are structured, generated, and/or managed can lead to drastic changes in user experiences in various industries. In some cases, the GUI objects themselves may allow for functionality and/or results that would not be possible in their absence. Interface improvements are accordingly, in some cases, implemented to improve the functionality of the electronic devices upon which they are generated.

Interface usage and design in certain industries, however, has been slow to develop, which has caused a reliance on mere automation of previous practices. In the insurance underwriting industry, for example, traditional practices and techniques have been enhanced with paperless or digital documentation and enhanced communication abilities (e.g., e-mail as opposed to faxing), which help speed complex and time-consuming underwriting activities. These simple digitalization enhancements, however, have failed to address some of the most crucial issues facing underwriting institutions.

BRIEF DESCRIPTION OF THE DRAWINGS

The figures depict embodiments for purposes of illustration only. One skilled in the art will readily recognize from the following description that alternative embodiments of the systems and methods illustrated herein may be employed without departing from the principles described herein, wherein.

DETAILED DESCRIPTION

I. Introduction

Figure 1:
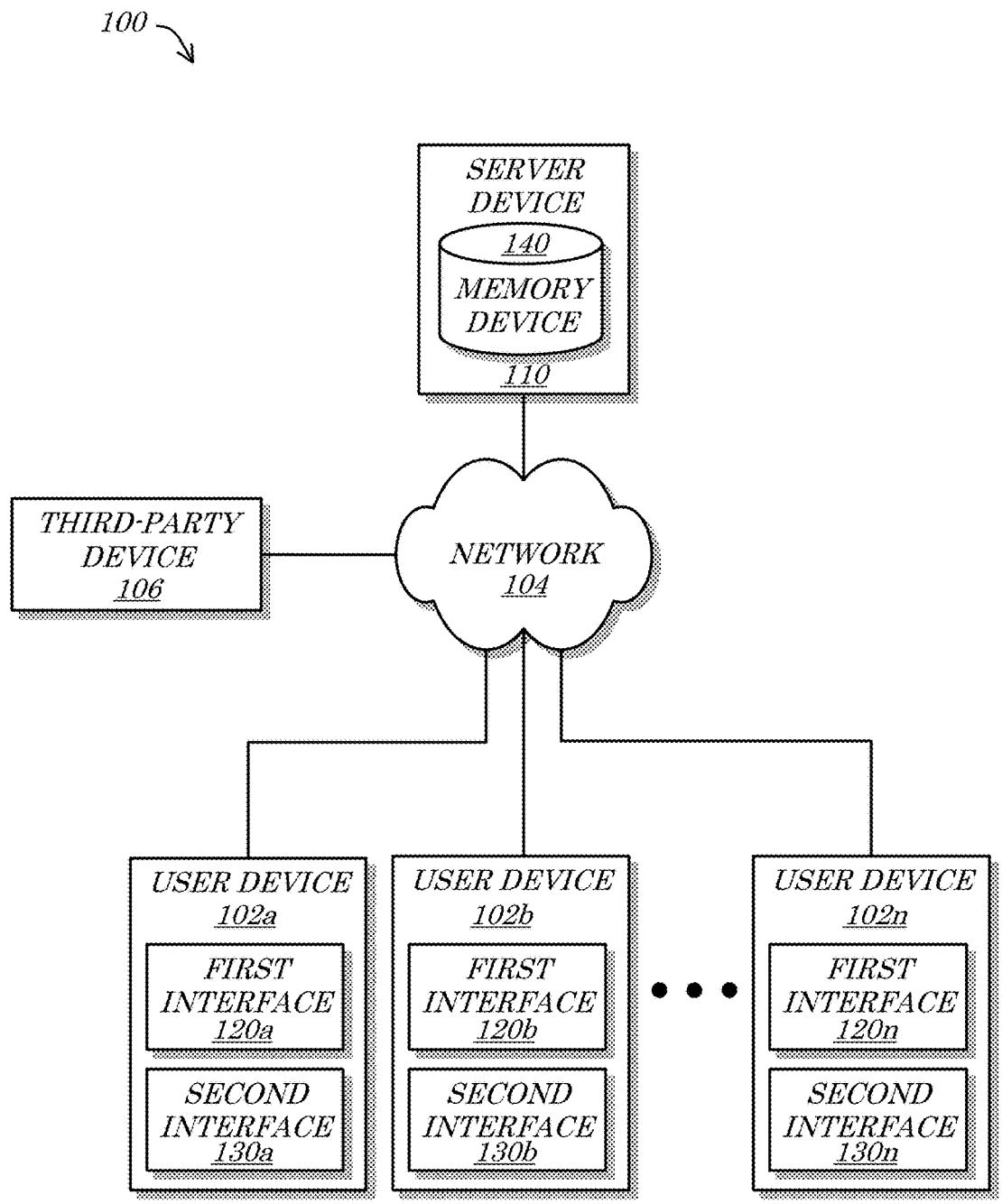
FIG. 1 is a block diagram of a system according to some embodiments.

Typical underwriting processes, while now often reliant on digital information as opposed to paper records, still require highly-experienced personnel to navigate and analyze various types of documentation from multiple disparate sources. Often, the desired documentation is stored in unstructured format, which limits automated search capabilities and increases the time needed to formulate an underwriting decision. The decision-making process is also highly subjective and/or heavily dependent upon an individual underwriter's experience and/or training. Accordingly, most underwriting decisions are handled by a limited pool of highly-experienced personnel, who themselves must constantly update their training and methodology.

Previous attempts at solving these problems have focused on creating and implementing rules and logic in an attempt to automatically underwrite risks associated with fact scenarios that fall within certain parameters. Simple or typical underwriting fact patterns, for example, can sometimes be automatically analyzed and/or decided, leaving only the most complicated or unusual scenarios for the limited highly-experienced underwriting staff to manage. While such attempts have achieved some success, the great complexity of underwriting processes has limited the pool of scenarios that can be automated and cannot operate outside of relatively tight programmatic parameter ranges. As risk factors change (which they often do), the applicability of automatic routines decreases, placing a higher burden on the limited highly-experienced underwriting staff.

Previous attempts also have failed to provide significant advantages to new underwriter training or on-boarding. Automated underwriting processes, for example, are directed to replacing underwriting staff, which precludes new underwriter involvement. Accordingly, new underwriter training remains a highly-focused educational process and, ultimately, must rely on the institutional knowledge of the limited set of highly-experienced underwriters that are available.

In accordance with embodiments herein, these and other deficiencies of existing systems are remedied by providing systems, apparatus, methods, and articles of manufacture for cooperatively-overlapped and Artificial Intelligence (AI)-managed interfaces. In some embodiments, for example, multiple cooperative interfaces may be provided (e.g., via an electronic and/or touch-screen device), with such interfaces being dynamically managed by various AI components, such as natural language processing, machine learning techniques, and/or neural network data processing. In such a manner, for example, even less-experienced underwriters may be effectively guided through an underwriting process that automatically leverages institutional knowledge, industry best-practices, and AI predictions. In some embodiments, such an AI system may substantially eliminate the need for an underwriter (experienced or not) to read through volumes of unstructured data, thereby greatly increasing the efficiency of even already knowledgeable staff.

II. Cooperatively-Overlapped AI Interface Systems

Referring first to FIG. 1, a block diagram of a system 100 according to some embodiments is shown. In some embodiments, the system 100 may comprise a plurality of user devices 102a-n, a network 104, a third-party device 106, and/or a server device 110. According to some embodiments, each of the user devices 102a-n may comprise and/or be in communication with a first interface 120a-n and/or a second interface 130a-n. In some embodiments, any or all of the devices 102a-n, 106, 110 may comprise and/or be in communication with a data storage and/or memory device 140. As depicted in FIG. 1, any or all of the devices 102a-n, 106, 110, 140 (or any combinations thereof) may be in communication via the network 104. In some embodiments, communications between and/or within the devices 102a-n, 106, 110, 140 of the system 100 may be utilized to provide and/or manage the interfaces 120a-n, 130a-n. The interfaces 120a-n, 130a-n may, for example, comprise cooperatively-overlapped AI interfaces as described herein.

Fewer or more components 102a-n, 104, 106, 110, 140 and/or various configurations of the depicted components 102a-n, 104, 106, 110, 140 may be included in the system 100 without deviating from the scope of embodiments described herein. In some embodiments, the components 102a-n, 104, 106, 110, 140 may be similar in configuration and/or functionality to similarly named and/or numbered components as described herein. In some embodiments, the system 100 (and/or portion thereof) may comprise a cooperatively-overlapped AI interface program, system, and/or platform programmed and/or otherwise configured to execute, conduct, and/or facilitate the methods 300, 400 of FIG. 3 and/or FIG. 4 herein, and/or portions thereof.

The user devices 102a-n, in some embodiments, may comprise any types or configurations of computing, mobile electronic, network, user, and/or communication devices that are or become known or practicable. The user devices 102a-n may, for example, comprise one or more Personal Computer (PC) devices, computer workstations (e.g., an underwriter workstation), tablet computers, such as an iPad® manufactured by Apple®, Inc. of Cupertino, Calif., and/or cellular and/or wireless telephones, such as an iPhone® (also manufactured by Apple®, Inc.) or an LG Optimus™ Zone™ 3 smart phone manufactured by LG® Electronics, Inc. of San Diego, Calif., and running the Android® operating system from Google®, Inc. of Mountain View, Calif. In some embodiments, the user devices 102a-n may comprise devices owned and/or operated by one or more users, such as insurance agents, underwriters, account managers, agents/brokers, customer service representatives, data acquisition partners and/or consultants or service providers. According to some embodiments, the user devices 102a-n may communicate with the server device 110 via the network 104 to provide the underwriting interfaces 120a-n, 130a-n and/or to conduct AI-facilitated underwriting decision-making processes, in accordance with embodiments described herein.

In some embodiments, the user devices 102a-n may interface with the server device 110 and/or the third-party device 106 to effectuate communications (direct or indirect) with one or more other user devices 102a-n (such communication not explicitly shown in FIG. 1) operated by other users (e.g., other underwriters), for example. In some embodiments, the user devices 102a-n may interface with the server device 110 to effectuate communications (direct or indirect) with the third-party device 106 (such communication also not explicitly shown in FIG. 1). In some embodiments, the user devices 102a-n may execute instructions that cause the generation of the interfaces 120a-n, 130a-n, for example, and the server 110 may process AI algorithms based on input and/or output of the interfaces 120a-n, 130a-n to provide automatically-sourced unstructured data to facilitate an underwriting process. As described herein, for example, the user devices 102a-n and/or the server device 110 may communicate with the third-party device 106 to define and/or apply one or more natural language, neural network, and/or machine learning topic models, to identify applicable unstructured (and/or structured) data and/or to suggest one or more courses of underwriting action.

The network 104 may, according to some embodiments, comprise a Local Area Network (LAN; wireless and/or wired), cellular telephone, Bluetooth®, Near Field Communication (NFC), and/or Radio Frequency (RF) network with communication links between the server device 110, the user devices 102a-n, the third-party device 106, and/or the memory device 140. In some embodiments, the network 104 may comprise direct communications links between any or all of the components 102a-n, 104, 106, 110, 140 of the system 100. The user devices 102a-n may, for example, be directly interfaced or connected to one or more of the server device 110 and/or the third-party device 106 via one or more wires, cables, wireless links, and/or other network components, such network components (e.g., communication links) comprising portions of the network 104. In some embodiments, the network 104 may comprise one or many other links or network components other than those depicted in FIG. 1. The user devices 102a-n may, for example, be connected to the server device 110 and/or the third-party device 106 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102a-n, 104, 106, 110, 140 of the system 100. The network 104 may comprise one or more cellular telephone networks with communication links between the user devices 102a-n and the server device 110, for example, and/or may comprise the Internet, with communication links between the server device 110 and the third-party device 106 and/or the memory device 140, for example.

The third-party device 106, in some embodiments, may comprise any type or configuration of a computerized processing device such as a PC, laptop computer, computer server, database system, application, web service, and/or other electronic service, device, devices, or any combination thereof. In some embodiments, the third-party device 106 may be owned and/or operated by a third-party (i.e., an entity different than any entity owning and/or operating either the user devices 102a-n or the server device 110; such as a neural network and/or machine learning service provider). The third-party device 106 may, for example, execute one or more web services that provide (i) natural language processing, such as Automatic Speech Recognition (ASR)

and/or Natural Language Understanding (NLU), such as the Amazon® Lex™ service available from Amazon.com, Inc. of Seattle, Wash. or the Google® Cloud Natural Language service available from Google®, Inc. of Mountain View, Calif., (ii) neural network processing, such as the DjiNN and Tonic Deep Neural Network (DNN) web service available from the Clarity Lab of the University of Michigan of Ann Arbor, Mich., and/or (iii) machine learning, such as the IBM® Watson™ Machine Learning service available from IBM® of Armonk, N.Y. In some embodiments, the third-party device 106 may receive data from one or more of the interfaces 120a-n, 130a-n (e.g., from the user devices 102a-n and/or the server device 110), may apply one or more natural language, neural network, and/or machine learning models to the received data, and may transmit a result of the one or more models the user devices 102a-n and the server device 110 (e.g., for defining and/or generating output to be provided to a user via one or more of the interfaces 120a-n, 130a-n). According to some embodiments, the third-party device 106 may comprise a plurality of devices and/or may be associated with a plurality of third-party entities.

In some embodiments, the server device 110 may comprise an electronic and/or computerized controller device, such as a computer server communicatively coupled to interface with the user devices 102a-n and/or the third-party device 106 (directly and/or indirectly). The server device 110 may, for example, comprise one or more PowerEdge™ R830 rack servers manufactured by Dell®, Inc. of Round Rock, Tex. which may include one or more Twelve-Core Intel® Xeon® E5-4640 v4 electronic processing devices. In some embodiments, the server device 110 may comprise a plurality of processing devices specially-programmed to execute and/or conduct processes that are not practicable without the aid of the server device 110. The server device 110 may, for example, execute one or more coded rule sets to dynamically and automatically generate and/or provide underwriting assistance based on one or more stored AI models, such dynamic computerized assistance not being capable of being conducted without the benefit of the specially-programmed server device 110, particularly not in real-time (e.g., within minutes or hours of receiving an underwriting request). According to some embodiments, the server device 110 may be located remote from one or more of the user devices 102a-n and/or the third-party device 106. The server device 110 may also or alternatively comprise a plurality of electronic processing devices located at one or more various sites and/or locations.

According to some embodiments, the server device 110 may store and/or execute specially programmed instructions to operate in accordance with embodiments described herein. The server device 110 may, for example, execute one or more programs, modules, models, and/or routines that provide real-time underwriting feedback, advice, automatically-sourced unstructured data, and/or cooperatively-overlapped interfaces, as described herein. According to some embodiments, the server device 110 may comprise a computerized processing device, such as a computer server and/or other electronic device to manage and/or facilitate transactions and/or communications regarding the user devices 102a-n. An insurance company employee, agent, underwriter, and/or other user may, for example, utilize the server device 110 to (i) receive a plurality of underwriting requests, (ii) price and/or underwrite one or more products, and/or (iii) provide cooperatively-overlapped interfaces (e.g., the interfaces 120a-n, 130a-n) via which the user may be provided with real-time AI data, suggestions, recommendations, and/or options, as described herein.

In some embodiments, the user devices 102a-n, the third-party device 106, and/or the server device 110 may be in communication with the memory device 140. The memory device 140 may comprise, for example, various databases and/or data storage mediums that may store, for example, underwriting request data, client preference and/or characteristics data, structured underwriting data (e.g., loss data, accounting data, billing data), unstructured documents and/or data (e.g., news articles, webpages, online search results), historic risk data (e.g., claims data), geo-location data, business classification data, historic underwriting performance metrics (e.g., statistics) defined by the server device 110, natural language processing rules and/or models, neural network rules and/or models, machine learning rules and/or models, pricing data, cryptographic keys and/or data, login and/or identity credentials, and/or instructions that cause various devices (e.g., the server device 110, the third-party device 106, and/or the user devices 102a-n) to operate in accordance with embodiments described herein.

The memory device 140 may store, according to some embodiments, natural language, neural network, and/or machine learning models (e.g., runtime and/or training models) utilized to provide real-time, dynamic, and/or automatic feedback, suggestions, and/or AI-sourced unstructured data to one or more underwriters. In some embodiments, the memory device 140 may comprise any type, configuration, and/or quantity of data storage device or devices that are or become known or practicable. The memory device 140 may, for example, comprise an array of optical and/or solid-state hard drives configured to store AI models that operate upon data provided by (and/or requested by) the user devices 102a-n (e.g., via the interfaces 120a-n, 130a-n), underwriting performance analysis data (e.g., analysis formulas and/or mathematical models), and/or various operating instructions, drivers, etc. While the memory device 140 is depicted as a stand-alone component of the system 100 and/or the server 110, the memory device 140 may comprise multiple components. In some embodiments, a multi-component memory device 140 may be distributed across various devices and/or may comprise remotely dispersed components. Any or all of the user devices 102a-n, the third-party device 106, and/or the server 110 may comprise the memory device 140 or a portion thereof, for example.

Figure 2:
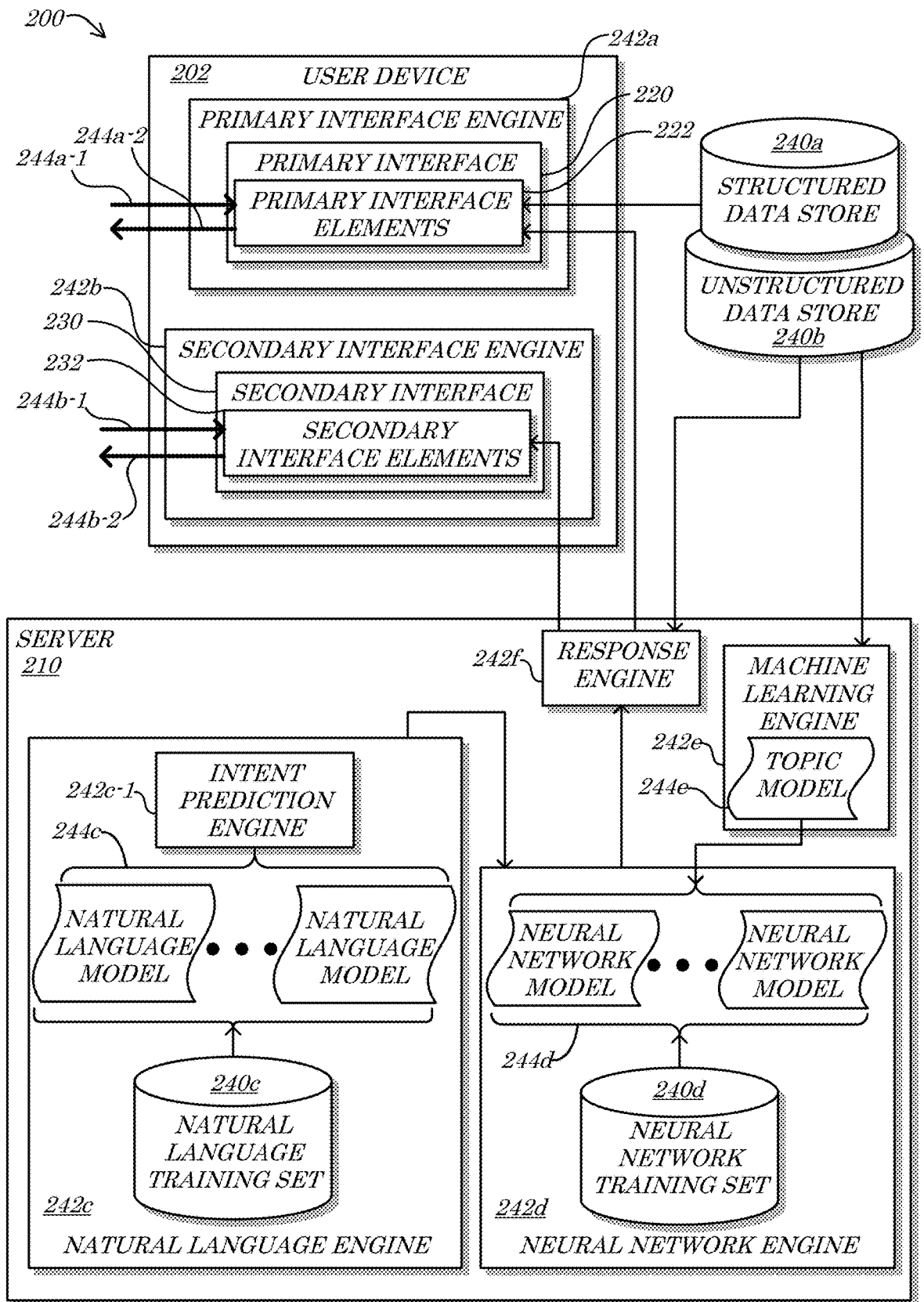
FIG. 2 is block diagram of a system according to some embodiments.

Turning now to FIG. 2, a block diagram of a system 200 according to some embodiments is shown. In some embodiments, the system 200 may comprise a user device 202 in communication with a server 210. In some embodiments, the user device 202 may provide, comprise, output, and/or generate a first or primary interface 220 comprising a plurality of primary interface elements 222 and/or a second or secondary interface 230 comprising a plurality of secondary interface elements 232. According to some embodiments, the user device 202 and/or the server 210 may also or alternatively be in communication with and/or comprise one or more memory devices 240a-d (e.g., any of which may be implemented and/or defined by an object data store and/or other data storage technique and/or service, such as utilizing the Amazon® Simple Storage Service (Amazon® S3™) available from Amazon.com, Inc. of Seattle, Wash. or an open-source third-party database service, such as MongoDB™ available from MongoDB, Inc. of New York, N.Y.). According to some embodiments, the one or more memory devices 240a-d may comprise a first or structured data store 240a, a second or unstructured data store 240b, a third or natural language training set 240c, and/or a fourth or neural network training set 240d.

In some embodiments, the system 200 may comprise, define, and/or implement or execute various programs, procedures, modules, and/or programmatic engines 242a-e that operate upon (e.g., utilize as input) and/or define or utilize various stored data/models 244a-e. The user device 202 may, for example, comprise, define, and/or execute a first or primary interface engine 242a that defines, generates, provides, and/or manages the primary interface 220 (and/or the primary interface elements 222 thereof). According to some embodiments, execution of the primary interface engine 242a may result in and/or cause a receiving of primary input 244a-1 and/or a providing or outputting of primary output 244a-2. In some embodiments, the user device 202 may comprise, define, and/or execute a second or secondary interface engine 242b that defines, generates, provides, and/or manages the secondary interface 230 (and/or the secondary interface elements 232 thereof). According to some embodiments, execution of the secondary interface engine 242b may result in and/or cause a receiving of secondary input 244b-1 and/or a providing or outputting of secondary output 244b-2. In some embodiments, the primary interface 220 may comprise a primary underwriting interface that is utilized by an underwriter (not shown) to retrieve and analyze structured and/or unstructured data, e.g., from the structured data store 240a and/or the unstructured data store 240b, respectively.

According to some embodiments, the server may comprise, define, and/or execute a third or natural language engine 242c that operates upon the input 244a-1, 244b-1 and/or the output 244a-2, 244b-2 and utilizes one or more of the natural language training set 240c and/or a natural language model 244c. The natural language engine 242c may, for example, process user input 244a-1, 244b-1 and/or output 244a-2, 244b-2 utilizing an intent prediction engine 242c-1 that comprises programmatic logic rule sets for processing the user input 244a-1, 244b-1 and/or output 244a-2, 244b-2 in accordance with one or more natural language models 244c. The intent prediction engine 242c-1 may, for example, parse, decode, or deconstruct textual and/or alphanumeric primary input 244a-1 provided by the user via the primary interface elements 222 of the primary interface 220, select one (or more) of the natural language models 244c for use in processing the parsed/decoded/deconstructed primary input 244a-1, and/or apply the selected natural language model 244c to the parsed/decoded/deconstructed primary input 244a-1.

In some embodiments, each natural language model 244c may comprise a statistical data store that relates one or more words, word sequences, phrases, sentences, menu selections, button clicks, and/or numbers (collectively, "artifacts") with relative likelihoods (e.g., probabilities) of such artifacts being indicative of a certain "intent" or goal of the user. In the context of underwriting, for example, certain artifacts, such as a call (e.g., a mouse click and/or menu item selection—e.g., primary input 244a-1 received via one of the primary interface elements 222) to review a specific type of document, may correlate to a stored relative probability (e.g., above a certain probability threshold and/or ranked highest of all stored probabilities) indicating that the user is researching annual sales metrics for a particular client/customer/applicant. The same primary input 244a-1 may correlate to various low (e.g., below the probability threshold and/or not ranked highest) probabilities for various other "intents", such as reviewing claim history, local risk characteristics, etc. In some embodiments, the natural language model 244c may be trained or "primed" by utilization of the natural language training set 240c. The natural language training set 240c may, for example, comprise a set or subset of pre-correlated artifacts, probabilities, and possible "intents" that are utilized to create and/or inform the natural language models 244c.

According to some embodiments, the natural language engine 242c (and/or the intent prediction engine 242c-1 thereof) may transmit output and/or results of natural language processing to a neural network engine 242d. The neural network engine 242d may accept and/or receive the natural language processing results as input and may process the results utilizing one or more neural network models 244d. In some embodiments, a neural network model 244d may be utilized to logically derive an expected outcome based on the natural language processing result, along with an expected probability of the outcome being true or valid. According to some embodiments, multiple possible outcomes may be derived from processing utilizing the neural network models 244d, and the outcome with the highest probability may be selected. In some embodiments, different neural network models 244d may be utilized to process the same natural language result(s), and the outcomes of these "competing" neural network models 244d may be compared, weighted, and/or analyzed. According to some embodiments, the outcome with the highest probability may be chosen. In some embodiments, one of various competing outcomes may be randomly chosen, with success feedback later being included in the neural network models 244d to update the probability associated with the particular neural network model 244d and/or outcome that is selected.

In some embodiments, the neural network models 244d may correlate various "intents" derived, calculated, computed, and/or selected by the intent prediction engine 242c-1 with various topics, data types, response types, suggestions, and/or recommendations. While an example "intent" (e.g., a natural language processing result) in the underwriting context may be "to review risks for a particular business", for example, the neural network engine 242d may calculate that the most likely topic that could be of use to the user is identifying "similar risk metrics" for other similar businesses. According to some embodiments, the data stored in the neural network models 244d that identifies and/or correlates such topics and/or probabilities may be generated from and/or updated by (e.g., "trained" by) the neural network training set 240d. The neural network training set 240d may, for example, comprise a set or subset of pre-correlated topics, probabilities, and possible outcomes that are utilized to create and/or inform the neural network models 244d.

According to some embodiments, the neural network engine 242d may identify and/or select a topic that defines a type of document and/or data source from the unstructured data store 240b. Certain types of unstructured documents may, for example, be identified as having correlated probabilities of relevance to certain user intents that exceed a predetermined probability threshold. In some embodiments, such document or data types and/or data sources may be identified by a machine learning engine 242e. The machine learning engine 242e may, for example, analyze utilization of unstructured data from the unstructured data store 240b and/or analyze content of the unstructured data to define a topic model 244e. According to some embodiments, the topic model 244e may correlate various topics (and/or intents) to one or more documents, document types, data types, etc.—e.g., stored in the unstructured data store 240b. In such a manner, for example, document reviews conducted by experienced underwriters may define correlations in the topic model 244e so that other and/or less-experienced underwriters may be automatically directed to certain documents, document types, metrics, etc., based on the inferred intent of such underwriters (e.g., based on their usage of the primary interface 220).

In some embodiments, the outcome(s) of the neural network engine 242d (and/or of the natural language engine 242c and/or the machine learning engine 242e) may be provided to a response engine 242f. The response engine 242f may, for example, comprise programmatic rules and/or logic that are utilized to formulate one or more responses to the user. According to some embodiments, the response engine 242f may formulate a natural language text response (and/or may rely on or call the natural language engine 242c to do so) and provide the response to the user device 202, e.g., via one or more of the primary interface components 222 and the secondary interface components 232. In some embodiments, the response may be generated based on natural language results and/or neural network outcomes that are derived from primary input 244a-1 and/or primary output 244a-2 of the primary interface components 222. According to some embodiments, the response may trigger and/or influence the generation of the secondary interface 230. The secondary interface 230 may, for example, be superimposed on or over a portion of the primary interface 220 selected by the neural network engine 242d and/or the response engine 242f, such that the interfaces 220, 230 are cooperatively overlapped. In the case that primary input 244a-1 (and/or primary output 244a-2) from the primary interface elements 222 is utilized to generate the response, for example, the secondary interface engine 242b may be directed by the server 210 to generate and/or position the secondary interface elements 232 proximate to a location of the primary input 244a-1 (and/or primary output 244a-2) in or on the primary interface 220. In such a manner, for example, underwriter activity in the primary interface 220 may cause a generation and strategic positioning of the secondary interface 230 (e.g., at least partially overlapping the primary interface 220).

According to some embodiments, the response engine 242f may provide various content in a response to the user. Some content may comprise natural language text responses to a user's questions or queries, for example, while other responses may comprise documents, images, and/or videos (e.g., from the unstructured data store 240b), figures, numbers, metrics, webpages, forms (e.g., from the structured data store 240a), links to various information, and/or combinations thereof. In some embodiments, feedback (e.g., additional or subsequent input 244a-1, 244b-1) from the user may be provided to update one or more of the natural language models 244c, the neural network models 244d, and/or the topic model 244e.

Fewer or more components 202, 210, 220, 222, 230, 232, 240a-d, 242a-f, 242c-1, 244a-e, 244a-1, 244a-2, 244b-1, 244b-2 and/or various configurations of the depicted components 202, 210, 220, 222, 230, 232, 240a-d, 242a-f, 242c-1, 244a-e, 244a-1, 244a-2, 244b-1, 244b-2 may be included in the system 200 without deviating from the scope of embodiments described herein. In some embodiments, the components 202, 210, 220, 222, 230, 232, 240a-d, 242a-f, 242c-1, 244a-e, 244a-1, 244a-2, 244b-1, 244b-2 may be similar in configuration and/or functionality to similarly named and/or numbered components as described herein. In some embodiments, the system 200 (and/or one or more portions thereof) may comprise a cooperatively-overlapped AI interface program, system, and/or platform programmed and/or otherwise configured to execute, conduct, and/or facilitate the methods 300, 400 of FIG. 3 and/or FIG. 4 herein, and/or portions or combinations thereof.

III. Cooperatively-Overlapped AI Interface Processes

Figure 3:
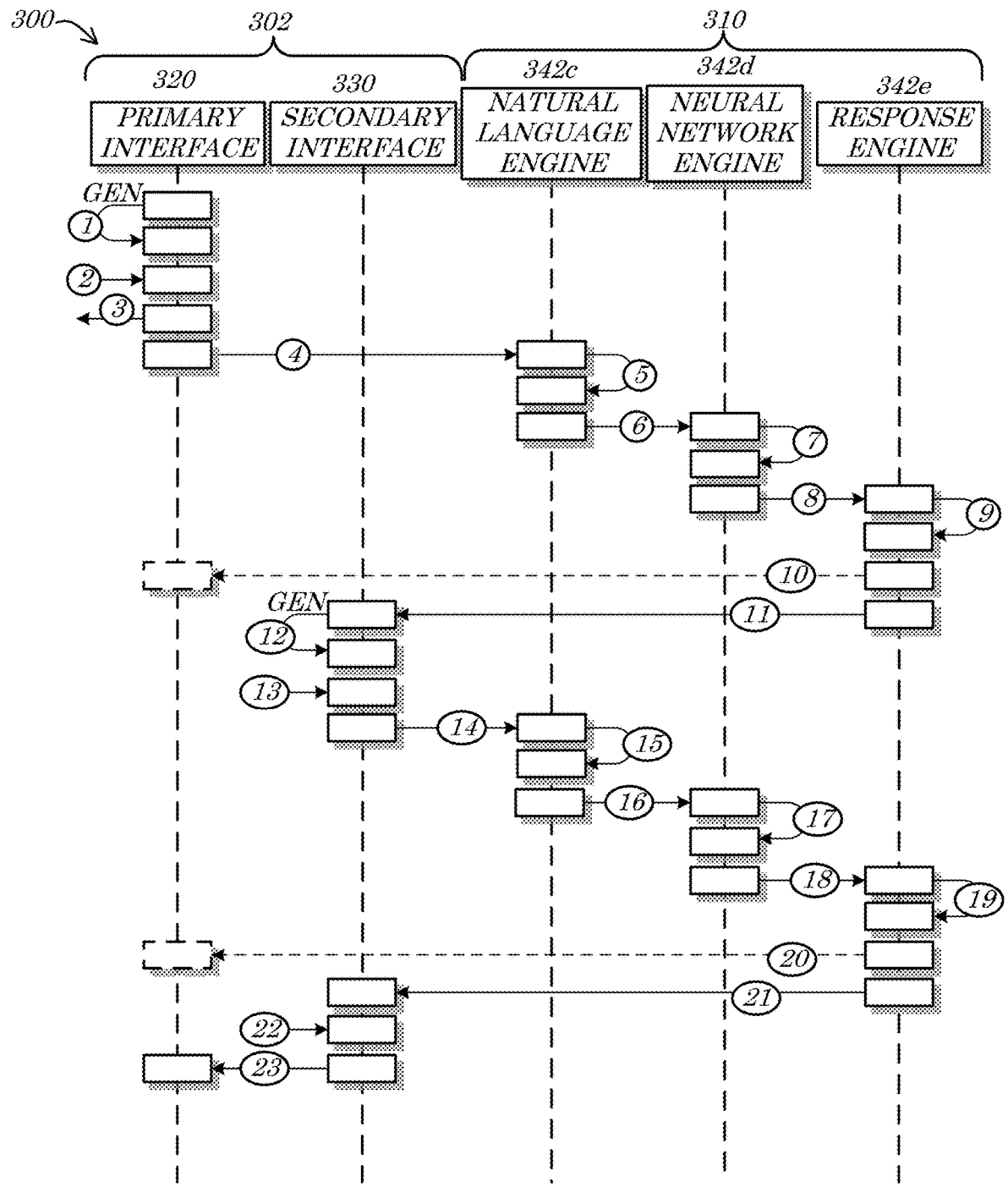
FIG. 3 is a systemic flow diagram of a method according to some embodiments.

Referring now to FIG. 3, a systemic flow diagram of a process 300 according to some embodiments, is shown. The process 300 may, for example, be executed by various hardware and/or logical components via interactive communications, such as communications between a user device 302 and a server 310. In some embodiments, such communications may be specifically directed between various components of the user device 302, such as a primary interface 320 and a secondary interface 330 (e.g., cooperatively-overlapped as described herein), and/or the server 310, such as a natural language engine 342c, a neural network engine 342d, and/or a response engine 342e. While not explicitly depicted in FIG. 3, the devices 302, 310, 320, 330, 342c-e may be in communication via various networks and/or network components, and/or may process received data by executing stored instructions via one or more electronic processing devices.

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the memory devices 140, 240a-d, 640, 740a-e of FIG. 1, FIG. 2, FIG. 6, FIG. 7A, FIG. 7B, FIG. 7C, FIG. 7D, and/or FIG. 7E herein) may store thereon instructions that when executed by a machine (such as a computerized processor; e.g., the user device 302 and/or the server 310) result in performance according to any one or more of the embodiments described herein.

In some embodiments, the process 300 (e.g., for providing strategically and/or selectively and cooperatively overlapped interfaces, e.g., the primary interface 320 and the secondary interface 330) may begin at "1" with generation of the primary interface 320. An application (not shown) executed on the user device 302 may, for example, cause the primary interface 320 to be generated, such as in response to a user command, request, and/or other triggering event. According to some embodiments, the primary interface 320 may comprise an underwriting interface provided by an insurance company to an insurance underwriter, agent, and/or other user. The primary interface 320 may, for example, provide a workspace via which the underwriter/user may research one or more underwriting matters or cases, document underwriting decisions, and/or select or execute one or more underwriting actions (e.g., requesting additional information, and/or approving, denying, and/or modifying an underwriting product request or submission). The primary interface 320 may accept, at "2" for example, input from the underwriter/user. In some embodiments, the input may comprise a query, selection of a menu item, etc. According to some embodiments, the primary interface 320 may generate and/or provide an output, in response to the input, at "3". The output may be provided by execution of the primary interface application on the user device 302, for example, and/or may comprise data queried and/or obtained from one or more other programs and/or sources (not shown). In the case of an underwriting process utilizing the primary interface 320, for example, the input may comprise a request for payroll information for a particular client, customer, and/or account, and the output may comprise payroll data retrieved from an account data store (not shown; e.g., the structured data store 240a of FIG. 2 herein).

According to some embodiments, the primary interface 320 may transmit and/or provide one or more of the input and the output to the server 310, at "4". In some embodiments, the input and/or output may be provided to (and/or retrieved by) the natural language engine 342c. According to some embodiments, the natural language engine 342c (and/or the server 310) may monitor the primary interface 320 and may proactively retrieve, scrape, and/or harvest the input and/or output upon detection of "2" and/or "3", respectively. In some embodiments, the natural language engine 342c may process the input and/or output by executing and/or implementing natural language rules and/or logic, at "5". The natural language engine 342c may utilize a natural language model that correlates identifiable portions of the input and/or output with probabilities associated with different "interests" that the underwriter/user may have. In the case that the input comprises the request for payroll data for the particular client and/or the output comprises the requested payroll data, for example, the natural language engine 342c may infer (e.g., utilizing the natural language model(s)) that there is a high probability (e.g., greater than a certain percentage threshold) that the user is exploring changes in risk related to an increase or decrease in activity for a business of the client/account. According to some embodiments, the input processed by the natural language engine 342c may comprise text entry, menu selections, pointer actions (e.g., mouse-overs, clicks), and/or voice. The natural language engine 342c may, for example, process text and/or voice input (e.g., recognize, parse) from the user to determine that there is a high (over-threshold) probability that the user has requested payroll data for the particular client and/or that such a request is likely (e.g., above a certain likelihood threshold) to be indicative of the user attempting to ascertain changes in the business for risk analysis purposes.

In some embodiments, the recognized text/speech and/or other input/output processing results may be provided by the natural language engine 342c to the neural network engine 342d, at "6". In some embodiments, the neural network engine 342d may process the result(s) by executing and/or implementing neural network rules and/or logic, at "7". The neural network engine 342d may, according to some embodiments, receive and/or retrieve the results (at "6") and analyze the results (at "7") utilizing one or more neural network models. In some embodiments, the neural network model(s) correlates various possible "intent" results (e.g., "changes in business volume" or "changes in business risk") with probabilities of being associated with various topics or concepts. In the example of payroll number queries in an attempt to analyze business risk changes, for example, the neural network engine 342d may identify that it is likely (e.g., a stored probability exceeds a predetermined threshold) that the intent to analyze business risk changes is related to concepts, such as industry/sector payroll changes, sales/ gross receipt changes, and/or similar risks for other industry entities (such as seasonal employment issues). According to some embodiments, one or more data sources associated with any identified topics may be identified and/or acquired. In some embodiments, the outcome(s) of the neural network processing of the natural language results may be transmitted and/or provided to the response engine 342e, at "8".

According to some embodiments, the response engine 342e may receive and/or retrieve the neural network processing outcome(s) at "8" and may process the outcome(s) by executing and/or implementing response rules and/or logic, at "9". The response engine 342e may, for example, utilize the natural language results, the neural network outcomes, and/or any documentation or data sources identified by the neural network engine 342d (e.g., based on machine learning as described herein) to compile and/or construct a response for the user. In some embodiments, the response may be unsolicited, e.g., in the sense that the user query at "2" has been satisfied by the provision of the output at "3", via the primary interface 320. According to some embodiments, the response may comprise a natural language text portion and/or a multimedia portion (e.g., audio, video, images, and/or hyperlink data), any or all of which may be derived and/or sourced from one or more relational data stores (not shown). In the case of the payroll data query resulting in the business risk analysis intent, for example, the neural network processing may provide an outcome defining a topic of similar risks in the same industry and/or an identification of an employee concentration report document as being associated with such a topic. According to some embodiments, the response may comprise a first text portion that informs the user that the server 310 has identified the intent of the user and/or a second text portion that suggests to the user that a certain type of exposure be analyzed or considered (e.g., with respect to payroll variations originally queried).

In some embodiments, the response engine 342e may transmit the response to the user device 302. The response engine 342e may transmit the response to the primary interface 320, at "10" for example, and/or may transmit the response to the secondary interface 330, at "11". According to some embodiments, the transmitting at "11" may comprise a command and/or trigger that causes the user device 302 to initiate and/or generate the secondary interface 330, at "12". As described herein, the secondary interface 330 may be generated based on the primary interface 320, such that the two interfaces 320, 330 are cooperatively overlapped. A size, position, and/or window status (e.g., maximized or minimized) of the primary interface 320 may be utilized, for example, to set a size, position, and/or window status for the secondary interface 330. According to some embodiments, the secondary interface 330 may be generated and output to display over or "overlap" with a portion of the primary interface 320 that does not correspond to the input and/or output (from "2" and/or "3", respectively) utilized to formulate the response. In such a manner, for example, the underwriter/user may continue to utilize the currently-utilized portion of the primary interface 320 and receive the response via a secondary interface 330 sized and/or placed in a manner that provides the response to the user, but does not interrupt their current utilization (e.g., mouse and/or cursor focus position) of the primary interface 320.

According to some embodiments, the user may provide input to the secondary interface 330, at "13". In some embodiments, the secondary interface 330 may transmit and/or provide the user input to the server 310, at "14". According to some embodiments, the input may be provided to (and/or retrieved by) the natural language engine 342c. In some embodiments, the natural language engine 342c (and/or the server 310) may monitor the secondary interface 330 and may proactively retrieve, scrape, and/or harvest the input upon detection of an input event at "13". In some embodiments, the natural language engine 342c may process the input by executing and/or implementing natural language rules and/or logic, at "15". The natural language engine 342c may, for example, convert user speech or audio to text and/or parse such text (and/or entered text) to identify one or more intents of the user. In the case that the original (or first) response was directed to suggesting that the user check into certain risk types for the particular account, for example, the user may enter text that is parsed and analyzed to be likely to be indicative of a desire of the user to retrieve employee concentration figures for the particular account.

In some embodiments, the recognized text/speech and/or other input processing results may be provided by the natural language engine 342c to the neural network engine 342d, at "16". In some embodiments, the neural network engine 342d may process the result(s) by executing and/or implementing neural network rules and/or logic, at "17". The neural network engine 342d may, according to some embodiments, process the natural language result to determine that the employee concentration figures are likely available in an employee concentration report. In some embodiments, the outcome(s) of the neural network processing of the natural language results may be transmitted and/or provided to the response engine 342e, at "18".

According to some embodiments, the response engine 342e may receive and/or retrieve the neural network processing outcome(s) at "18" and may process the outcome(s) by executing and/or implementing response rules and/or logic, at "19". The response engine 342e may, for example, utilize the natural language results, the neural network outcomes, and/or any documentation or data sources identified by the neural network engine 342d (e.g., based on machine learning as described herein; such as the employee concentration report) to compile and/or construct a response for the user. In the case that the user input at "13" has requested employee concentration figures that have been determined to be likely available in the employee concentration report, for example, the response engine 342e may provide a copy of the report, an excerpt from the report, a machine translation of the report, and/or a link to a storage location of the report, as part of a second or follow-up response.

In some embodiments, the response engine 342e may transmit the follow-up response to the user device 302. The response engine 342e may transmit the follow-up response to the primary interface 320, at "20" for example, and/or may transmit the response to the secondary interface 330, at "21". In the case that the user has requested the specific figures and/or report at "13", for example, the requested data and/or document(s) may be transmitted directly to and/or automatically included in the primary interface 320 at "20". In some embodiments, the data/document(s) may be provided via the secondary interface 330, e.g., to allow the primary interface 320 to remain as configured by the user. According to some embodiments, the user may provide input via the secondary interface 330, at "22". The user may, for example, indicate an acceptance of the follow-up response and/or the data/document(s) therein and/or may request that such data/document(s) be added to (e.g., copied into) the primary interface 320. In some embodiments, the secondary interface 330 may be responsive to the user request/input at "22" and may accordingly transmit, transfer, and/or copy or replicate the follow-up response and/or associated data/document(s) into the primary interface 320, at "23". According to some embodiments, the data/document(s) (and/or links or reference thereto) may be automatically copied into an appropriate section or portion of the primary interface 320. In some embodiments, the section may comprise a section currently being utilized by the user when the initial response is triggered, e.g., a section in which the original input/output is provided at "2" and/or "3". In such a manner, for example, the underwriter/user may automatically be presented with contextually-significant recommendations, suggestions, data, and/or documentation, that may automatically (and/or easily, e.g., upon verification or request) be populated into the underwriter's workflow documentation managed via the primary interface 320.

While many specific actions of the process 300 have been described with respect to FIG. 3, fewer or more actions, transmissions, and/or processing procedures may be implemented in the process 300 without deviating from embodiments herein. In some embodiments, fewer or more components 302, 310, 320, 330, 342c-e and/or various configurations of the depicted components 302, 310, 320, 330, 342c-e may be included in the process 300 without deviating from the scope of embodiments described herein. In some embodiments, the components 302, 310, 320, 330, 342c-e may be similar in configuration and/or functionality to similarly named and/or numbered components as described herein. In some embodiments, the process 300 (and/or one or more portions thereof) may comprise a distributed surety contract ledger program, system, and/or platform programmed and/or otherwise configured to execute, conduct, and/or facilitate the method 400 of FIG. 4 herein, and/or portions thereof.

Figure 4:
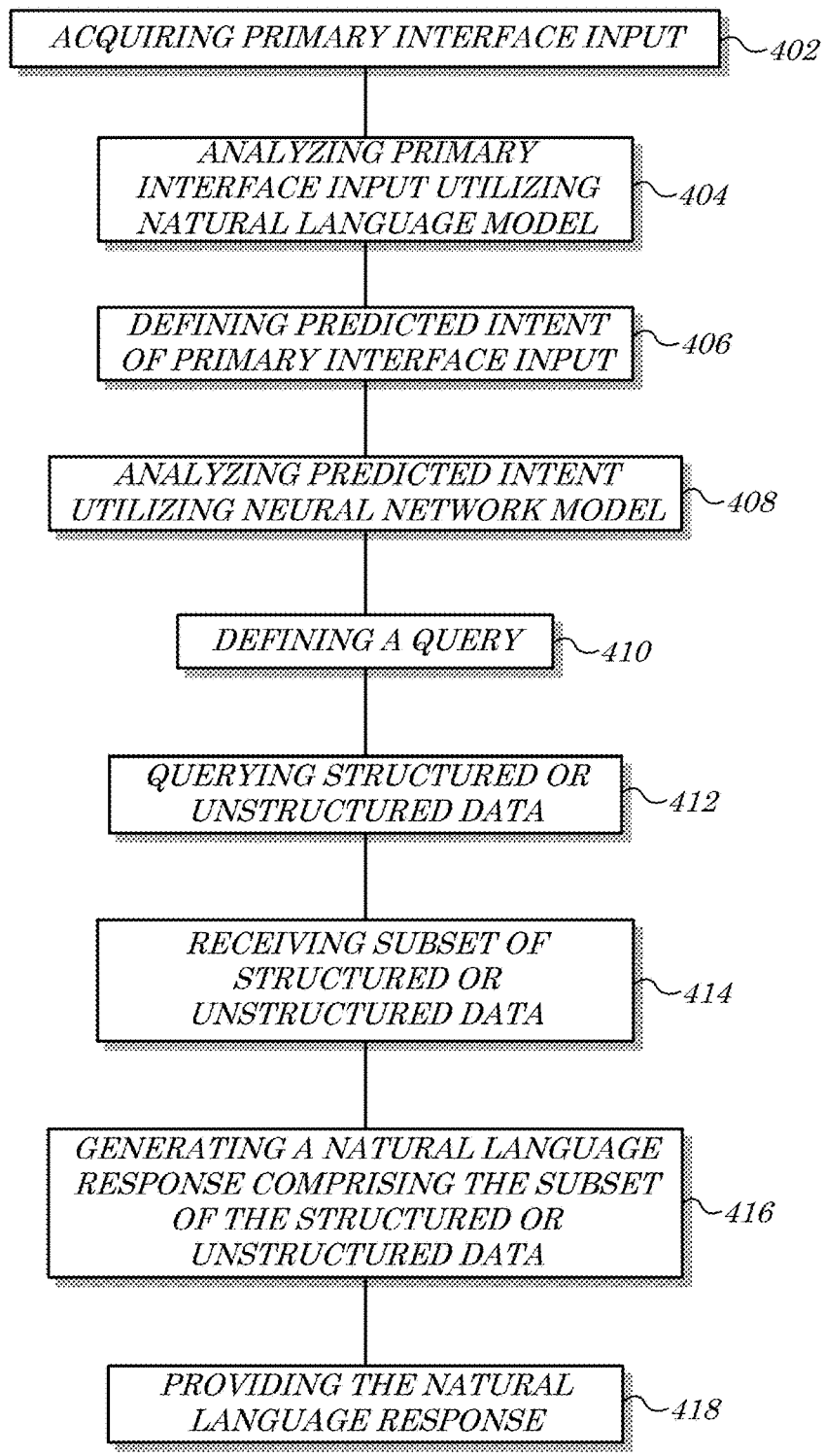
FIG. 4 is a flow diagram of a method according to some embodiments.

Referring now to FIG. 4, a flow diagram of a method 400 according to some embodiments is shown. In some embodiments, the method 400 may be performed and/or implemented by and/or otherwise associated with one or more specialized and/or specially-programmed computers (e.g., the user devices 102a-n, 202, 302 and/or the server devices 110, 210, 310, all of FIG. 1, FIG. 2, and/or FIG. 3 herein), computer terminals, computer servers, computer systems and/or networks, and/or any combinations thereof (e.g., by one or more multi-threaded and/or multi-core processing units of an insurance company AI data processing system). In some embodiments, the method 400 may be embodied in, facilitated by, and/or otherwise associated with various input mechanisms and/or interfaces (e.g., the interfaces 120a-n, 130a-n, 220, 230, 320, 330 of FIG. 1, FIG. 2, and/or FIG. 3 herein).

According to some embodiments, the method 400 may comprise acquiring (e.g., by a processing device and/or via an electronic communication network) primary interface input, at 402. A primary interface, such as a GUI of an insurance underwriting program provided to a user and/or via a remote user device, may, for example, accept input from the user and/or may provide output thereto. In some embodiments, a software agent or "listener" may identify an input and/or output event of the primary interface and/or may trigger a transmission of data indicative of the input/output to a server device (e.g., remote from the user device). According to some embodiments, the server may poll or monitor the primary interface (and/or the remote user device) to identify and/or acquire data indicative of the input and/or output. The acquired input may, in some embodiments, comprise data entered by the user into the primary interface in furtherance of an underwriting and/or risk analysis process. According to some embodiments, the output of the primary interface may comprise data queried on behalf of and/or provided to the user via the primary interface (e.g., pulled from and/or provided by a third-party device, such as a data service provider). According to some embodiments, input and/or output may also or alternatively be acquired from a secondary interface generated on the remote user device.

In some embodiments, the method 400 may comprise analyzing (e.g., by the processing device) the primary interface input (and/or output) utilizing a natural language model, at 404. A natural language processing program or engine may, for example, accept the data from the primary interface (e.g., input thereto and/or output thereof) as natural language input and process the input utilizing one or more natural language models. According to some embodiments, the natural language models may leverage statistical analysis of input artifacts to identify an "intent" or objective that is most likely to be associated with the primary interface data. In such a manner, for example, user input and/or data acquired by the user via the primary interface may be utilized to infer or predict an intent or goal of the user. In some embodiments, many data points correlating artifacts and possible intents may be necessary to provide accurate results. According to some embodiments, data defining the natural language data model(s) may be seeded with a training set or training data to facilitate occurrences of accurate results at least until the process 400 has been executed a substantial number of times to develop a native data set for natural language processing.

According to some embodiments, the method 400 may comprise defining (e.g., by the processing device) a predicted intent of the primary interface input, at 406. As a result of the analysis at 404, for example, one or more predicted intents associated with the primary interface data may be identified and/or defined. In some embodiments, an intent with the highest probability of being correlated with artifacts of the primary interface data may be selected. According to some embodiments, multiple predicted intents may be identified and/or defined. All intents or a certain number or percent of intents that have a likelihood of being correlated to the primary interface data that exceeds a predetermined threshold may, for example, be defined and/or selected.

In some embodiments, the method 400 may comprise analyzing (e.g., by the processing device) the predicted intent utilizing a neural network model, at 408. One or more neural network models may be utilized, for example, to identify a predicted, estimated, and/or likely outcome associated with the predicted intent(s). In some embodiments, a neural network model may correlate one or more predicted intents with a probability of being indicative of one or more concepts or topics. According to some embodiments, a plurality of neural network models may be executed and/or utilized, with each model returning an outcome. In some embodiments, the set of outcomes may be analyzed to determine which outcome has the highest probability and/or which outcomes exceed a threshold level of probability or likelihood (e.g., confidence). According to some embodiments, machine learning may be utilized to further correlate any given topic or concept to one or more types of documents, metrics, and/or data sources. In some embodiments, for example, a machine learning topic model may be utilized to identify a type of document associated with one or more of the relevant predicted intent results and/or one or more of the correlated topics and/or models. In such a manner, for example, user input and/or data acquired by the user via the primary interface may be utilized to infer or predict an intent or goal of the user and to further identify one or more topics associated with the user's goal (e.g., complementary topics). In some embodiments, many data points correlating intents and possible topics may be necessary to provide accurate results. According to some embodiments, data defining the neural network data model(s) may be seeded with a training set or training data to facilitate occurrences of accurate results at least until the process 400 has been executed a substantial number of times to develop a native data set for neural network processing.

According to some embodiments, the method 400 may comprise defining (e.g., by the processing device) a query, at 410. Once a relevant associated document, document type, metric, and/or other data item or source related to an identified topic is computed at 408, for example, a query may be generated that is directed to obtaining the relevant associated data. In some embodiments, the query may be structured to locate a subset of relevant data of the desired type from one or more data storage devices, files, and/or databases. The query may, for example, comprise an identification of the desired data type and an identification of a particular account, business classification, entity name, address, etc. According to some embodiments, the query may comprise a plurality of queries directed to various data sources in which the desired data may reside.

In some embodiments, the method 400 may comprise, querying (e.g., by the processing device, via the electronic communication network, and/or from a database) structured or unstructured data, at 412. The query generated and/or built at 410 may, for example, be transmitted as a request and/or command to one or more data storage devices, such as various accessible databases. According to some embodiments, such as in the case that the query comprises multiple parallel queries, the queries (or instances thereof in the case they are identical) may be transmitted to a plurality of data storage devices. In some embodiments, the query may comprise a plurality of serial, staged, and/or tiered queries. In such embodiments, a first query may be directed to a first data source, for example, and a second query may be directed to searching the results from the first query. In the case that the data type desired to be searched comprises unstructured data, for example, the first query may locate and/or identify the unstructured data and the second query may comprise a text, numeric, and/or logical search of unstructured content of the identified unstructured data retrieved by the first query.

According to some embodiments, the method 400 may comprise receiving (e.g., by the processing device, via the electronic communication network, and/or from the database) a subset of the structured or unstructured data, at 414. First, second, and/or additional queries may return results from various data stores, for example, and may be received by and/or retrieved by the server. In some embodiments, the received results may comprise a subset of available data, such as a subset of available unstructured data. In such a manner, for example, unstructured data associated with the user's primary interface input/output may be automatically gathered and/or aggregated (e.g., logically and/or mathematically).

In some embodiments, the method 400 may comprise generating (e.g., by the processing device) a natural language response comprising the subset of the structured or unstructured data, at 416. In the case that the underwriter/user provided input and/or caused output, via the primary interface (and/or the secondary interface), that was directed to a specific underwriting goal (such as identifying changes in risk metrics for an existing insurance account), for example, an audio, video, image, and/or alphanumeric response may be constructed that is directed to assisting the underwriter with the underwriting goal. Such a feature may be especially useful (as noted herein) for newer or trainee underwriters. The underwriter may utilize the primary interface (e.g., as taught and/or instructed) to research whether any risk metrics for an account have changed, for example, but may not be aware that the change in a value for a particular variable and/or metric, in a particular industry, may not be of concern (e.g., seasonal staffing changes due to seasonality in the industry for which the account does business and/or is classified in). In accordance with some embodiments, the seasonality issue (e.g., a topic) may be identified (e.g., at 408) and incorporated into the response to inform the underwriter of the issue. In some embodiments, the query results may also or alternatively be provided. Instead of or in addition to a recommendation to research seasonality issues, for example, the response may comprise a document that describes the industry-specific seasonality upon which the recommendation is based, or may provide a value, figure, or metric derived from a query of the document.

According to some embodiments, the method 400 may comprise providing (e.g., by the processing device, via the electronic communication network, and/or to the remote user device) the natural language response, at 418. The text and/or subset of unstructured data may be transmitted, for example, to the remote user device, causing the primary and/or secondary interface to output the response to the user. In some embodiments, the input/output utilized to generate the response may originate from the primary interface and the providing at 418 may comprise causing a generation, initiation, execution, sizing, and/or positioning of the secondary interface, e.g., cooperatively overlapped with the primary interface. In the case that the input/output originated from a first portion of the primary interface, for example, the secondary interface may be generated and/or output to overlap with a different portion of the primary interface. In some embodiments, the response may comprise one or more commands, parameters, and/or setting information that are utilized by the remote user device to generate, size, position, and/or otherwise arrange or output the secondary interface and/or the response.

In some embodiments, any transmissions that are sent and/or received between the various devices that may be utilized in the method 400 (e.g., a remote user device, a server device, and/or a third-party device) may be secured via any compression and/or encryption protocols that are or become known or practicable. According to some embodiments, fewer or more devices, data storage structures, and/or method 400 events may be included in the method 400. In some embodiments, for example, the method 400 may also or alternatively comprise (i) receiving, e.g., by the server device and/or from the remote user device, an underwriting decision (e.g., approve, deny, modify), and/or (ii) selling, e.g., to a client, customer (current or potential), and/or account owner, an underwriting product in accordance with the underwriting decision. In such a manner, for example, an underwriting product may be sold that has been underwritten by a less-experienced underwriter, while the process has been guided (e.g., utilizing cooperatively-overlapped AI-driven interfaces) by AI processing that leverages the experience and know-how of more-experienced underwriting personnel. Such a system and attendant process may greatly reduce errors and/or omissions for a less-experienced underwriter, allowing such personnel to more freely participate in handling an underwriting workload, which reduces the overall burden and strain on the underwriting staff and ultimately permits a higher volume of properly-executed underwriting decisions, and accordingly, increased profits.

IV. Cooperatively-Overlapped AI Interfaces

Figure 5:
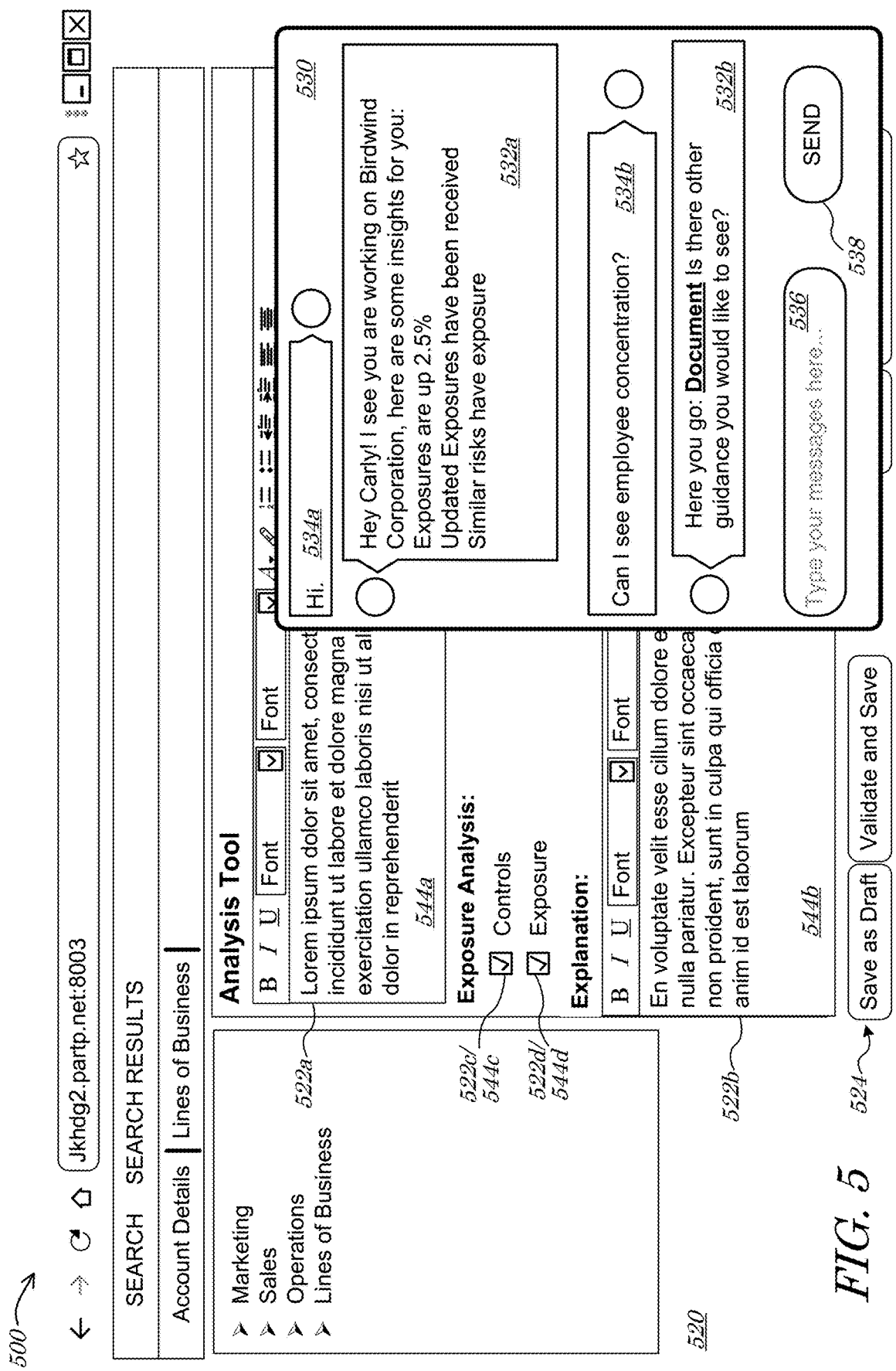
FIG. 5 is a diagram of an example interface system according to some embodiments.

Turning now to FIG. 5, a diagram of an example interface system 500 according to some embodiments is shown. In some embodiments, the interface system 500 may comprise output and/or a display (not separately depicted) of a mobile electronic user device (not shown) that outputs a primary interface 520. The primary interface 520 may comprise, for example, an underwriting GUI comprising a plurality of interface input/output elements 522*a-d* and/or action elements 524. In some embodiments, the system 500 may also or alternatively comprise a secondary interface 530, e.g., overlaid on and/or overlapped with the primary interface 520. The secondary interface 530 may comprise, for example, an informational or "chat" interface comprising AI output elements 532*a-b*, AI input elements 534*a-b*, a chat box 536, and/or a "send" button 538.

According to some embodiments, the interfaces 520, 530 may comprise one or more of a web page, web form, database entry form, API, spreadsheet, table, and/or application or other GUI via which a user or other entity may enter data (e.g., provide or define input) to perform underwriting (or other) actions, e.g., via the primary interface 520, while being provided with AI-managed intelligence, suggestions, recommendations, and/or data, e.g., via the secondary interface 530, as described herein. The interfaces 520, 530 may, for example, comprise a front-end of an AI-enhanced underwriting system and/or platform programmed and/or otherwise configured to execute, conduct, and/or facilitate the methods 300, 400 of FIG. 3 and/or FIG. 4 herein, and/or portions or combinations thereof. In some embodiments, the interfaces 520, 530 may be output via a computerized and/or specially-programmed device, such as the user devices 102*a-n*, 202, 302 and/or the server devices 110, 210, 310, 610, all of FIG. 1, FIG. 2, FIG. 3, and/or FIG. 6 herein.

According to some embodiments, the primary interface 520 may comprise one or more tabs and/or other segmented and/or logically-presented data forms and/or fields. In some embodiments, the primary interface 520 may be configured and/or organized to allow and/or facilitate underwriting processes. According to some embodiments, the primary interface 520 may comprise a first input/output element 522*a* that permits a user (not shown) to enter and/or receive first data 544*a* descriptive of an underwriting research and/or decision-making activity. The first input/output element 522*a* may comprise a text box field that includes, stores, accepts, outputs, and/or houses the first data 544*a*, that is descriptive of risk metrics for a particular account and/or business entity. In some embodiments, a second input/output element 522*b* may comprise a text box field that includes, stores, accepts, outputs, and/or houses second data 544*b*, that is descriptive of underwriting reasoning, methodology, findings, and/or notes. According to some embodiments, a third input/output element 522*c* and/or a fourth input/output element 522*d* may comprise check box elements that accept and/or output third data 544*c* and/or fourth data 544*d*, respectively.

In some embodiments, an underwriter (or other user) may utilize the primary interface 520 to research, analyze, document, and/or conduct one or more underwriting (and/or risk assessment or other analysis) actions, processes, and/or procedures. The underwriter may request that the first data 544a descriptive of the risk metrics for the particular account and/or business entity be output via the first input/output element 522a, for example, may edit the first data 544a, and/or may add or enter the first data 544a (or portions thereof). According to some embodiments, the underwriter may check-off the third input/output element 522c and/or the fourth input/output element 522d, defining the third data 544c and/or fourth data 544d, respectively. In some embodiments, the underwriter may enter reasoning or explanations for one or more underwriter actions or conclusions (e.g., too risky, no appetite, too much exposure, good risk, write a policy, decline a policy, setting a limit, deductible, and/or premium level, etc.), defining the second data 544b. In some embodiments, the underwriter may interact with one or more action elements 524, such as the depicted "Save a Draft" and/or "Validate and Save" buttons, to save, store, validate, authenticate, encode, encrypt, and/or otherwise document and/or manage the various underwriting data 544a-d.

According to some embodiments, any or all of the underwriting data 544a-d (whether input into or output from the primary interface 520) may be analyzed by one or more AI components, such as a natural language engine, a neural network engine, and/or a machine learning engine, as described herein. An AI system may monitor the underwriter's usage of the primary interface 520, for example, by capturing any or all of the underwriting data 544a-d as it is input and/or output, as the case may be. In some embodiments, while the AI processing and/or analysis may occur in the background and/or be unseen by the end-user, it may trigger visible changes in the primary interface 520. Responses in the form of updated data, notes, help buttons, and/or additional information icons (not shown) may be added to the primary interface 520, for example, based on AI processing of the underwriting data 544a-d.

In some embodiments, the AI processing of the underwriting data 544a-d may cause the generation and/or outputting of the secondary interface 530. The secondary interface 530 may be provided as a sub-window in the system 500, for example, that is superimposed on or overlaps a portion of the primary interface 520. According to some embodiments, the placement, sizing, and/or other features (e.g., opacity) of the secondary interface 530 may be defined by the AI processing of the underwriting data 544a-d. In the case that the first data 544a is provided via the first input/output element 522a to the user, for example, and is utilized to undertake AI processing that results in a creation of an AI response (e.g., a suggestion or recommendation), the secondary interface 530 may be positioned and/or sized to overlap with the primary interface 520 such that the first data 544a (or a specific portion thereof) remains visible to the user (e.g., the secondary interface 530 does not overlap the first input/output element 522a or a specific portion thereof).

According to some embodiments, the secondary interface 530 may provide a dialog or "chat" functionality to the user by providing an AI-generated response to the user via a first AI output element 532a. As depicted, for example, the first data 544a may be analyzed by the AI processing to identify that applicable intents and/or topics should be invoked to suggest to the user that, e.g., a certain type of potential risk should be researched or considered and/or that "Similar risks" that have exposure, should be considered or looked into, via the first AI output element 532a. In some embodiments, the user may initiate the chat or conversation by entering (or speaking) to populate a first AI input element 534a, and/or may enter a response or follow-up to the AI response provided in the first AI output element 532a by (e.g., utilizing the chat box 536 and the send button 538) providing text to populate a second AI input element 534b. As depicted in the example of FIG. 5, the user may follow-up on the AI suggestion to research similar risks by requesting data regarding "employee concentration", in the second AI input element 534b. In some embodiments, the AI processing may utilize the follow-up data to formulate a second (or follow-up) response, provided via a second AI output element 532b. As depicted, the follow-up response may comprise a hyperlink to the data that the user requested, e.g., as a result of natural language, neural network, and/or machine learning processing utilized to formulate the follow-up response. In such a manner, for example, the underwriter may be prompted by suggestions and/or recommendations that are generated based on underwriting knowledge "learned" by the AI system. Similarly, the underwriter may be saved substantial time by not needing to rely on experience or self-study reading of unstructured documents to locate desired information. The "Document" information may comprise an unstructured data document or data source, for example, that is provided to the user (via the second AI output element 532b) based on a machine learning topic model application that correlates document types to desired data types.

While various components of the interfaces 520, 530 have been depicted with respect to certain labels, layouts, headings, titles, and/or configurations, these features have been presented for reference and example only. Other labels, layouts, headings, titles, and/or configurations may be implemented without deviating from the scope of embodiments herein. Similarly, while a certain number of tabs, information screens, form fields, and/or data entry options have been presented, variations thereof may be practiced in accordance with some embodiments.

V. Cooperatively-Overlapped AI Interface Apparatus and Articles of Manufacture

Figure 6:
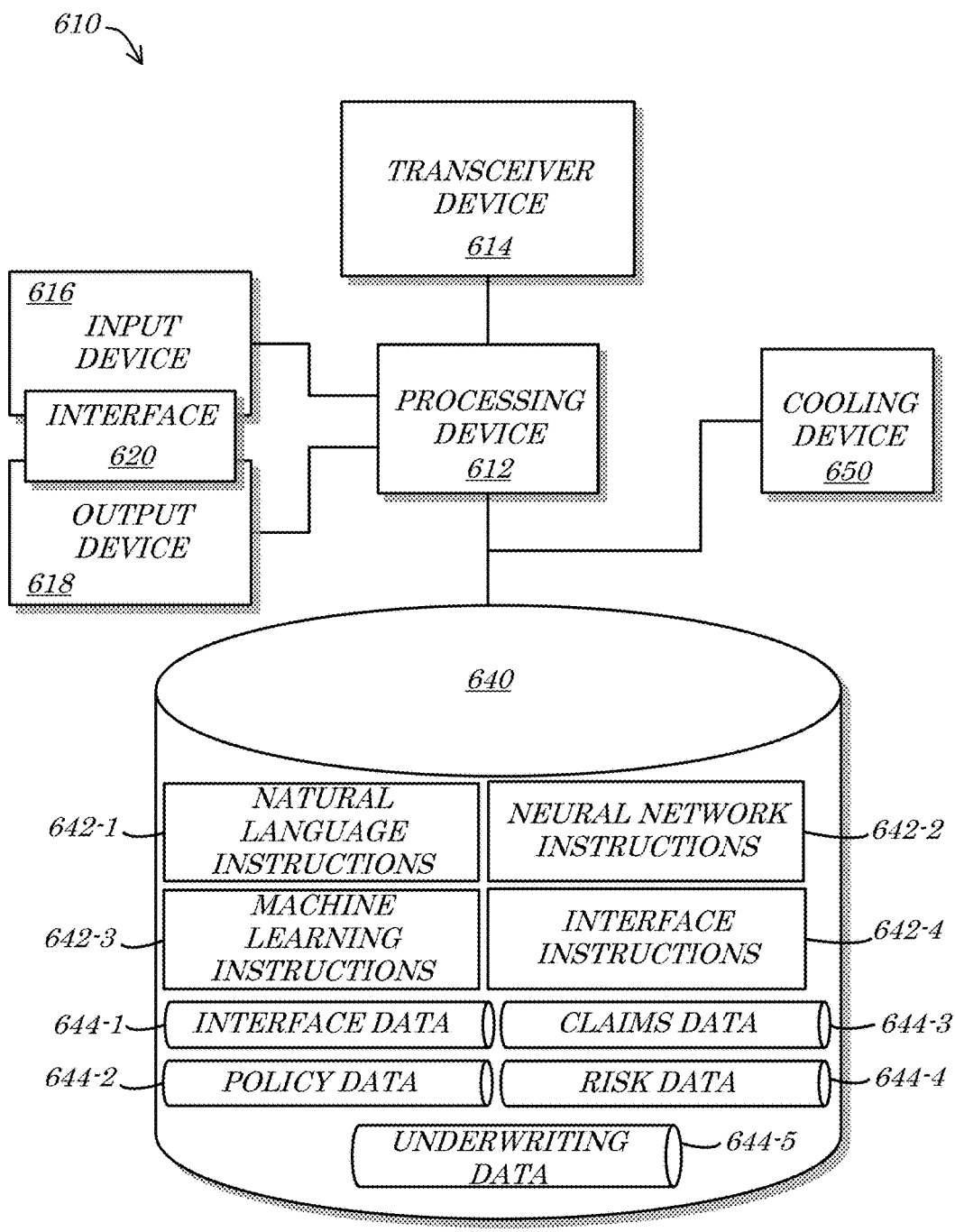
FIG. 6 is a block diagram of an apparatus according to some embodiments.
Figure 7A:
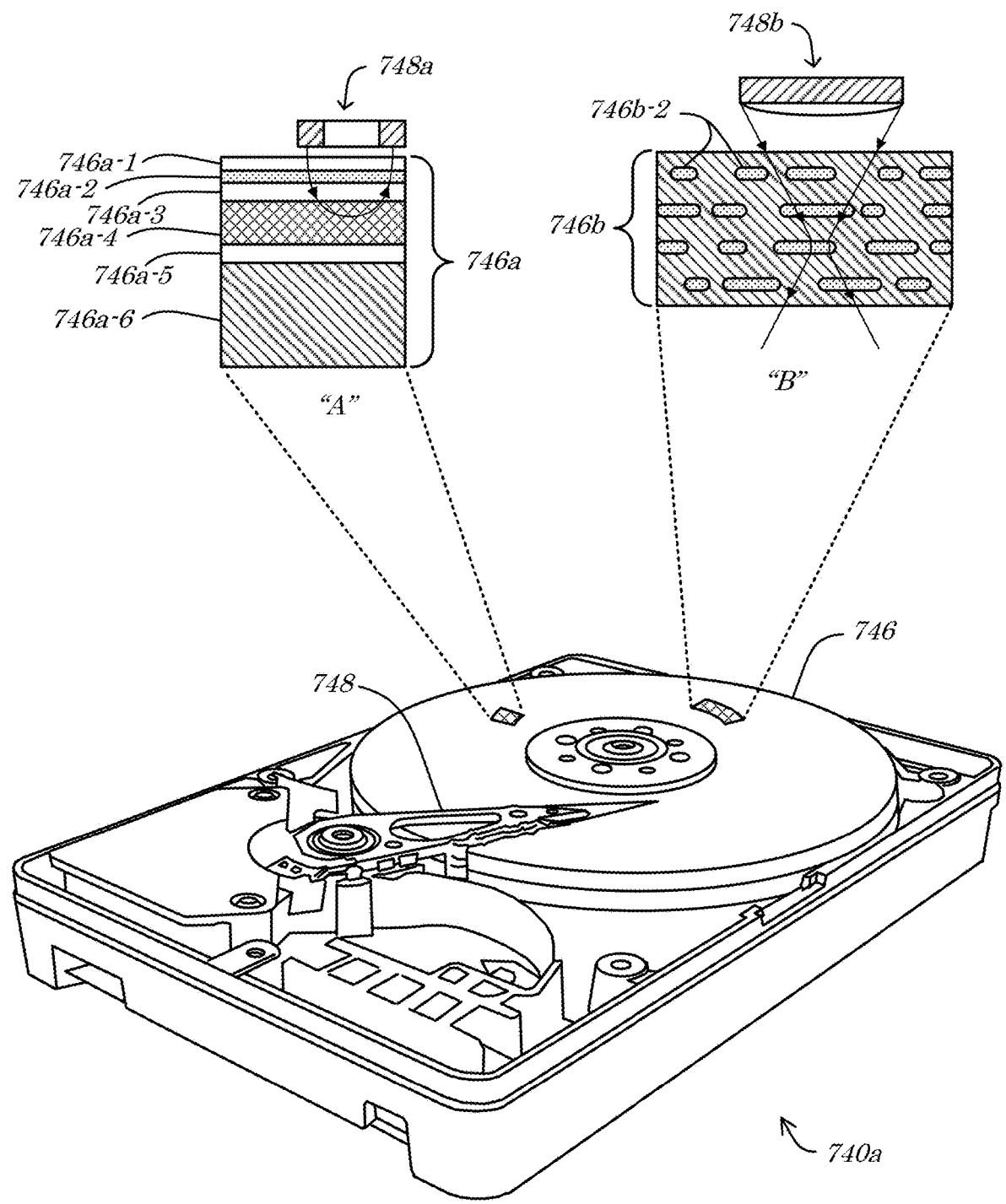
FIG. 7A, FIG. 7B, FIG. 7C, FIG. 7D, and FIG. 7E are perspective diagrams of exemplary data storage devices according to some embodiments.
Figure 7B:
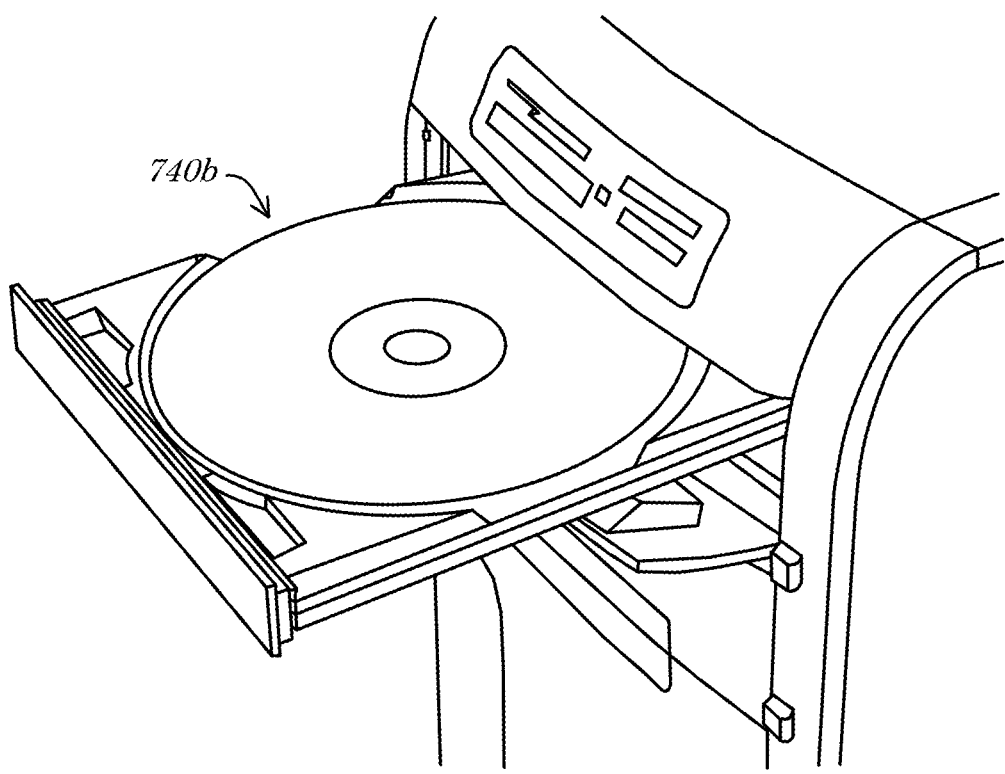
Figure 7C:
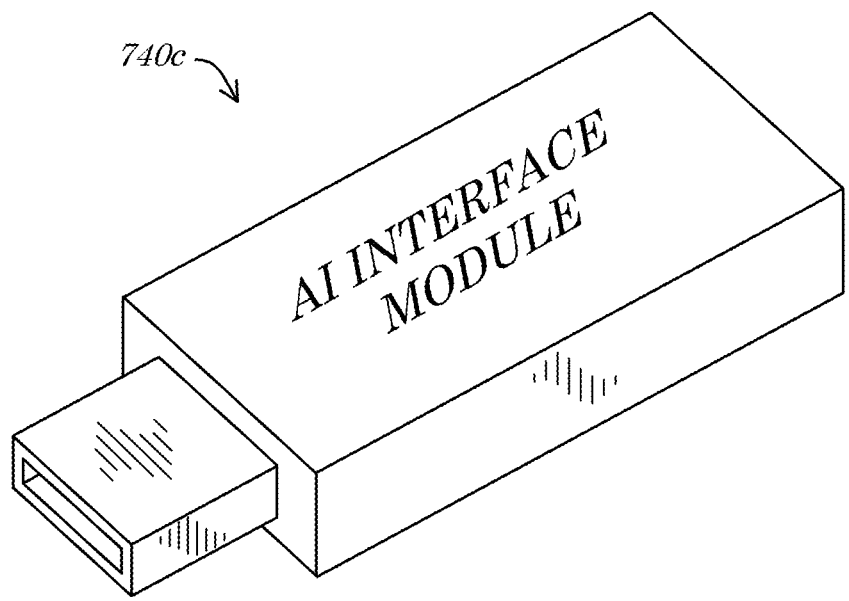
Figure 7D:
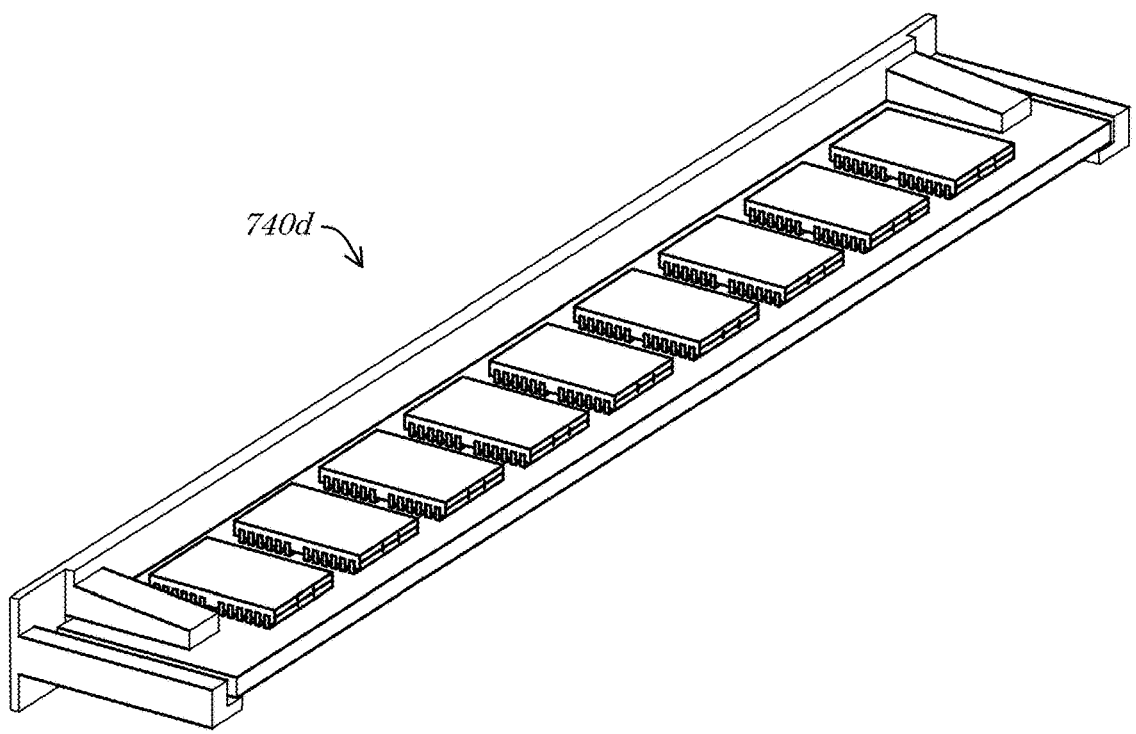
Figure 7E:
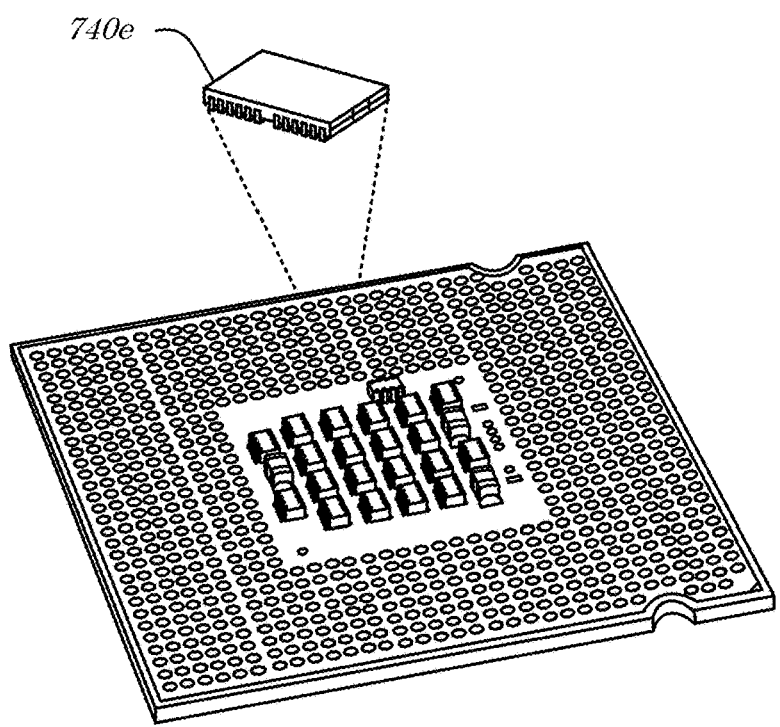

Turning to FIG. 6, a block diagram of an apparatus 610 according to some embodiments is shown. In some embodiments, the apparatus 610 may be similar in configuration and/or functionality to any of the user devices 102a-n, 202, 302, the third-party device 106, and/or the server devices 110, 210, 310, all of FIG. 1, FIG. 2, and/or FIG. 3 herein. The apparatus 610 may, for example, execute, process, facilitate, and/or otherwise be associated with the methods 200, 300 of FIG. 2 and/or FIG. 3 herein, and/or portions or combinations thereof. In some embodiments, the apparatus 610 may comprise a processing device 612, a transceiver device 614, an input device 616, an output device 618, an interface 620, a memory device 640 (storing various programs and/or instructions 642 and data 644), and/or a cooling device 650. According to some embodiments, any or all of the components 612, 614, 616, 618, 620, 640, 642, 644, 650 of the apparatus 610 may be similar in configuration and/or functionality to any similarly named and/or numbered components described herein. Fewer or more components 612, 614, 616, 618, 620, 640, 642, 644, 650 and/or various configurations of the components 612, 614, 616, 618, 620, 640, 642, 644, 650 be included in the apparatus 610 without deviating from the scope of embodiments described herein.

According to some embodiments, the processor 612 may be or include any type, quantity, and/or configuration of processor that is or becomes known. The processor 612 may comprise, for example, an Intel® IXP 2800 network processor or an Intel® XEON™ Processor coupled with an Intel® E7501 chipset. In some embodiments, the processor 612 may comprise multiple inter-connected processors, microprocessors, and/or micro-engines. According to some embodiments, the processor 612 (and/or the apparatus 610 and/or other components thereof) may be supplied power via a power supply (not shown) such as a battery, an Alternating Current (AC) source, a Direct Current (DC) source, an AC/DC adapter, solar cells, and/or an inertial generator. In the case that the apparatus 610 comprises a server such as a blade server, necessary power may be supplied via a standard AC outlet, power strip, surge protector, and/or Uninterruptible Power Supply (UPS) device.

In some embodiments, the transceiver device 614 may comprise any type or configuration of communication device that is or becomes known or practicable. The transceiver device 614 may, for example, comprise a Network Interface Card (NIC), a telephonic device, a cellular network device, a router, a hub, a modem, and/or a communications port or cable. According to some embodiments, the transceiver device 614 may also or alternatively be coupled to the processor 612. In some embodiments, the transceiver device 614 may comprise an IR, RF, Bluetooth™, Near-Field Communication (NFC), and/or Wi-Fi® network device coupled to facilitate communications between the processor 612 and another device (not shown).

According to some embodiments, the input device 616 and/or the output device 618 are communicatively coupled to the processor 612 (e.g., via wired and/or wireless connections and/or pathways) and they may generally comprise any types or configurations of input and output components and/or devices that are or become known, respectively. The input device 616 may comprise, for example, a keyboard that allows an operator of the apparatus 610 to interface with the apparatus 610 (e.g., by an underwriter, such as to conduct an underwriting process with the advantage of strategically and cooperatively-overlapped AI-managed interfaces, as described herein). The output device 618 may, according to some embodiments, comprise a display screen and/or other practicable output component and/or device. The output device 618 may, for example, provide one or more interfaces (such as the interfaces 120a-n, 130a-n, 220, 230, 320, 330, 520, 530 of FIG. 1, FIG. 2, FIG. 3, and/or FIG. 5 herein) via which AI-generated underwriting advice, suggestions, recommendations, and/or data or other information is provided to a user (e.g., via a website and/or mobile application). According to some embodiments, the input device 616 and/or the output device 618 may comprise and/or be embodied in a single device, such as a touch-screen monitor.

The memory device 640 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 640 may, according to some embodiments, store one or more of natural language instructions 642-1, neural network instructions 642-2, machine learning instructions 642-3, interface instructions 642-4, interface data 644-1, policy data 644-2, claims data 644-3, risk data 644-4, and/or underwriting data 644-5. In some embodiments, the natural language instructions 642-1, neural network instructions 642-2, machine learning instructions 642-3, interface instructions 642-4 may be utilized by the processor 612 to provide output information via the output device 618 and/or the transceiver device 614.

According to some embodiments, the natural language instructions 642-1 may be operable to cause the processor 612 to process the interface data 644-1, policy data 644-2, claims data 644-3, risk data 644-4, and/or underwriting data 644-5 in accordance with embodiments as described herein. Interface data 644-1, policy data 644-2, claims data 644-3, risk data 644-4, and/or underwriting data 644-5 received via the input device 616 and/or the transceiver device 614 may, for example, be analyzed, sorted, filtered, decoded, decompressed, ranked, scored, plotted, and/or otherwise processed by the processor 612 in accordance with the natural language instructions 642-1. In some embodiments, interface data 644-1, policy data 644-2, claims data 644-3, risk data 644-4, and/or underwriting data 644-5 may be fed by the processor 612 through one or more mathematical and/or statistical formulas and/or models in accordance with the natural language instructions 642-1 to conduct natural language model-based processing to define one or more predicted intents, as described herein.

In some embodiments, the neural network instructions 642-2 may be operable to cause the processor 612 to process the interface data 644-1, policy data 644-2, claims data 644-3, risk data 644-4, and/or underwriting data 644-5 in accordance with embodiments as described herein. Interface data 644-1, policy data 644-2, claims data 644-3, risk data 644-4, and/or underwriting data 644-5 received via the input device 616 and/or the transceiver device 614 may, for example, be analyzed, sorted, filtered, decoded, decompressed, ranked, scored, plotted, and/or otherwise processed by the processor 612 in accordance with the neural network instructions 642-2. In some embodiments, interface data 644-1, policy data 644-2, claims data 644-3, risk data 644-4, and/or underwriting data 644-5 may be fed by the processor 612 through one or more mathematical and/or statistical formulas and/or models in accordance with the neural network instructions 642-2 to conduct neural network model-based processing to define one or more neural network outcomes, as described herein.

According to some embodiments, the machine learning instructions 642-3 may be operable to cause the processor 612 to process the interface data 644-1, policy data 644-2, claims data 644-3, risk data 644-4, and/or underwriting data 644-5 in accordance with embodiments as described herein. Interface data 644-1, policy data 644-2, claims data 644-3, risk data 644-4, and/or underwriting data 644-5 received via the input device 616 and/or the transceiver device 614 may, for example, be analyzed, sorted, filtered, decoded, decompressed, ranked, scored, plotted, and/or otherwise processed by the processor 612 in accordance with the machine learning instructions 642-3. In some embodiments, interface data 644-1, policy data 644-2, claims data 644-3, risk data 644-4, and/or underwriting data 644-5 may be fed by the processor 612 through one or more mathematical and/or statistical formulas and/or models in accordance with the machine learning instructions 642-3 to conduct machine learning and/or topic model-based processing to define one or more unstructured data correlations, as described herein.

In some embodiments, the interface instructions 642-4 may be operable to cause the processor 612 to process the interface data 644-1, policy data 644-2, claims data 644-3, risk data 644-4, and/or underwriting data 644-5 in accordance with embodiments as described herein. Interface data 644-1, policy data 644-2, claims data 644-3, risk data 644-4, and/or underwriting data 644-5 received via the input device 616 and/or the transceiver device 614 may, for example, be analyzed, sorted, filtered, decoded, decompressed, ranked, scored, plotted, and/or otherwise processed by the processor 612 in accordance with the interface instructions 642-4. In some embodiments, interface data 644-1, policy data 644-2, claims data 644-3, risk data 644-4, and/or underwriting data 644-5 may be fed by the processor 612 through one or more mathematical and/or statistical formulas and/or models in accordance with the interface instructions 642-4 to provide two or more cooperatively-overlapped interfaces (such as the interfaces 120a-n, 130a-n, 220, 230, 320, 330, 520, 530 of FIG. 1, FIG. 2, FIG. 3, and/or FIG. 5 herein) via which input and/or output descriptive of underwriting processes may be captured, analyzed, and/or AI-based responses may be provided, as described herein.

According to some embodiments, the apparatus 610 may comprise the cooling device 650. According to some embodiments, the cooling device 650 may be coupled (physically, thermally, and/or electrically) to the processor 612 and/or to the memory device 640. The cooling device 650 may, for example, comprise a fan, heat sink, heat pipe, radiator, cold plate, and/or other cooling component or device or combinations thereof, configured to remove heat from portions or components of the apparatus 610.

Any or all of the exemplary instructions and data types described herein and other practicable types of data may be stored in any number, type, and/or configuration of memory devices that is or becomes known. The memory device 640 may, for example, comprise one or more data tables or files, databases, table spaces, registers, and/or other storage structures. In some embodiments, multiple databases and/or storage structures (and/or multiple memory devices 640) may be utilized to store information associated with the apparatus 610. According to some embodiments, the memory device 640 may be incorporated into and/or otherwise coupled to the apparatus 610 (e.g., as shown) or may simply be accessible to the apparatus 610 (e.g., externally located and/or situated).

Referring to FIG. 7A, FIG. 7B, FIG. 7C, FIG. 7D, and FIG. 7E, perspective diagrams of exemplary data storage devices 740a-e according to some embodiments are shown. The data storage devices 740a-e may, for example, be utilized to store instructions and/or data such as the natural language instructions 642-1, neural network instructions 642-2, machine learning instructions 642-3, interface instructions 642-4, interface data 644-1, policy data 644-2, claims data 644-3, risk data 644-4, and/or underwriting data 644-5, each of which is presented in reference to FIG. 6 herein. In some embodiments, instructions stored on the data storage devices 740a-e may, when executed by a processor, cause the implementation of and/or facilitate the methods 300, 400 of FIG. 3 and/or FIG. 4 herein, and/or portions or combinations thereof.

According to some embodiments, the first data storage device 740a may comprise one or more various types of internal and/or external hard drives. The first data storage device 740a may, for example, comprise a data storage medium 746 that is read, interrogated, and/or otherwise communicatively coupled to and/or via a disk reading device 748. In some embodiments, the first data storage device 740a and/or the data storage medium 746 may be configured to store information utilizing one or more magnetic, inductive, and/or optical means (e.g., magnetic, inductive, and/or optical-encoding). The data storage medium 746, depicted as a first data storage medium 746a for example (e.g., breakout cross-section "A"), may comprise one or more of a polymer layer 746a-1, a magnetic data storage layer 746a-2, a non-magnetic layer 746a-3, a magnetic base layer 746a-4, a contact layer 746a-5, and/or a substrate layer 746a-6. According to some embodiments, a magnetic read head 748a may be coupled and/or disposed to read data from the magnetic data storage layer 746a-2.

In some embodiments, the data storage medium 746, depicted as a second data storage medium 746b for example (e.g., breakout cross-section "B"), may comprise a plurality of data points 746b-2 disposed with the second data storage medium 746b. The data points 746b-2 may, in some embodiments, be read and/or otherwise interfaced with via a laser-enabled read head 748b disposed and/or coupled to direct a laser beam through the second data storage medium 746b.

In some embodiments, the second data storage device 740b may comprise a CD, CD-ROM, DVD, Blu-Ray™ Disc, and/or other type of optically-encoded disk and/or other storage medium that is or becomes know or practicable. In some embodiments, the third data storage device 740c may comprise a USB keyfob, dongle, and/or other type of flash memory data storage device that is or becomes know or practicable. In some embodiments, the fourth data storage device 740d may comprise RAM of any type, quantity, and/or configuration that is or becomes practicable and/or desirable. In some embodiments, the fourth data storage device 740d may comprise an off-chip cache such as a Level 2 (L2) cache memory device. According to some embodiments, the fifth data storage device 740e may comprise an on-chip memory device such as a Level 1 (L1) cache memory device.

The data storage devices 740a-e may generally store program instructions, code, and/or modules that, when executed by a processing device cause a particular machine to function in accordance with one or more embodiments described herein. The data storage devices 740a-e depicted in FIG. 7A, FIG. 7B, FIG. 7C, FIG. 7D, and FIG. 7E are representative of a class and/or subset of computer-readable media that are defined herein as "computer-readable memory" (e.g., non-transitory memory devices as opposed to transmission devices or media).

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant intends to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the invention as defined by the claims appended hereto.

What is claimed is:

1. A method for providing artificial intelligence feedback to guide an interface experience of a user, comprising:
generating, by an electronic processing device executing a primary interface engine, a primary interface comprising a plurality of primary interface elements;
generating, by the electronic processing device executing a secondary interface engine, a secondary interface comprising at least one secondary interface element;
storing, by at least one non-transitory data storage device, (i) structured data, (ii) unstructured data, (iii) at least one natural language model, (iv) at least one neural network model, (v) instructions defining a natural language engine, (vi) instructions defining a neural network engine, and (vii) instructions defining a response engine;
acquiring, by the electronic processing device and from at least one of the plurality of primary interface elements of the primary interface, at least one user input;
analyzing, by the electronic processing device executing the natural language engine and utilizing the at least one natural language model, the at least one user input;
defining, by the electronic processing device executing the natural language engine and based on the analyzing of the at least one user input, a predicted intent of the user;
analyzing, by the electronic processing device executing the neural network engine and utilizing the at least one neural network model, the predicted intent of the user;
defining, by the electronic processing device executing the neural network engine and based on the analyzing of the predicted intent of the user, a query for at least one of the structured data and the unstructured data;
querying, by the electronic processing device and utilizing the query for the at least one of the structured data and the unstructured data, the at least one of the structured data and the unstructured data;
receiving, by the electronic processing device and in response to the querying, a subset of the at least one of the structured data and the unstructured data;
generating, by the electronic processing device executing the response engine and utilizing the predicted intent of the user and the subset of the at least one of the structured data and the unstructured data, a natural language response comprising a sentence that includes data from the subset of the at least one of the structured data and the unstructured data;

identifying, by the electronic processing device, a position of the at least one of the plurality of primary interface elements of the primary interface;

defining, by the electronic processing device executing the secondary interface engine and based on the position of the at least one of the plurality of primary interface elements of the primary interface, at least one of a size and a position of the secondary interface such that the secondary interface selectively overlaps at least a portion of the primary interface, but does not overlap with the at least one of the plurality of primary interface elements of the primary interface; and providing, by the electronic processing device and via the at least one secondary interface element of the secondary interface, the natural language response.

2. The method of claim 1, wherein the at least one non-transitory data storage device further stores (viii) a natural language training data set, further comprising:

defining, by the electronic processing device executing the natural language engine and utilizing the natural language training data set, the at least one natural language model.

3. The method of claim 1, wherein the at least one non-transitory data storage device further stores (viii) a neural network training data set, further comprising:

defining, by the electronic processing device executing the neural network engine and utilizing the neural network training data set, the at least one neural network model.

4. The method of claim 3, wherein the at least one non-transitory data storage device further stores (ix) at least one topic model, further comprising:

selecting, by the electronic processing device executing the neural network engine and utilizing the at least one topic model, the neural network training data set from a plurality of available neural network training data sets.

5. The method of claim 1, wherein the at least one user input comprises data defining an underwriting action.

6. A non-transitory data storage device for providing artificial intelligence feedback to guide an interface experience of a user, the non-transitory data storage device storing (i) structured data, (ii) unstructured data, (iii) at least one natural language model, (iv) at least one neural network model, (v) instructions defining a natural language engine, (vi) instructions defining a neural network engine, and (vii) instructions defining a response engine, wherein execution of the (a) instructions defining the natural language engine, (b) instructions defining the neural network engine, and (c) instructions defining the response engine, by an electronic processing device, results in:

generating, by the electronic processing device executing a primary interface engine, a primary interface comprising a plurality of primary interface elements;

generating, by the electronic processing device executing a secondary interface engine, a secondary interface comprising at least one secondary interface element;

acquiring, by the electronic processing device and from at least one of the plurality of primary interface elements of the primary interface, at least one user input;

analyzing, by the electronic processing device executing the natural language engine and utilizing the at least one natural language model, the at least one user input;

defining, by the electronic processing device executing the natural language engine and based on the analyzing of the at least one user input, a predicted intent of the user;

analyzing, by the electronic processing device executing the neural network engine and utilizing the at least one neural network model, the predicted intent of the user;

defining, by the electronic processing device executing the neural network engine and based on the analyzing of the predicted intent of the user, a query for at least one of the structured data and the unstructured data;

querying, by the electronic processing device and utilizing the query for the at least one of the structured data and the unstructured data, the at least one of the structured data and the unstructured data;

receiving, by the electronic processing device and in response to the querying, a subset of the at least one of the structured data and the unstructured data;

generating, by the electronic processing device executing the response engine and utilizing the predicted intent of the user and the subset of the at least one of the structured data and the unstructured data, a natural language response comprising a sentence that includes data from the subset of the at least one of the structured data and the unstructured data;

identifying, by the electronic processing device, a position of the at least one of the plurality of primary interface elements of the primary interface;

defining, by the electronic processing device executing the secondary interface engine and based on the position of the at least one of the plurality of primary interface elements of the primary interface, at least one of a size and a position of the secondary interface such that the secondary interface selectively overlaps at least a portion of the primary interface, but does not overlap with the at least one of the plurality of primary interface elements of the primary interface; and providing, by the electronic processing device and via the at least one secondary interface element of the secondary interface, the natural language response.

7. The non-transitory data storage device of claim 6, wherein the non-transitory data storage device further stores (viii) a natural language training data set, and wherein execution of the (a) instructions defining the natural language engine, (b) instructions defining the neural network engine, and (c) instructions defining the response engine, by the electronic processing device, further results in:

defining, by the electronic processing device executing the natural language engine and utilizing the natural language training data set, the at least one natural language model.

8. The non-transitory data storage device of claim 6, wherein the non-transitory data storage device further stores (viii) a neural network training data set, and wherein execution of the (a) instructions defining the natural language engine, (b) instructions defining the neural network engine, and (c) instructions defining the response engine, by the electronic processing device, further results in:

defining, by the electronic processing device executing the neural network engine and utilizing the neural network training data set, the at least one neural network model.

9. The non-transitory data storage device of claim 8, wherein the non-transitory data storage device further stores (ix) at least one topic model, and wherein execution of the (a) instructions defining the natural language engine, (b) instructions defining the neural network engine, and (c)

instructions defining the response engine, by the electronic processing device, further results in:

selecting, by the electronic processing device executing the neural network engine and utilizing the at least one topic model, the neural network training data set from a plurality of available neural network training data sets.

10. The non-transitory data storage device of claim 6, wherein the at least one user input comprises data defining an underwriting action.

\* \* \* \* \*